(12) United States Patent
Zhang

(10) Patent No.: US 12,230,950 B2
(45) Date of Patent: Feb. 18, 2025

(54) JUNCTION BOX

(71) Applicant: Lumien Enterprise, Inc., Kennesaw, GA (US)

(72) Inventor: Haicheng Zhang, Acworth, GA (US)

(73) Assignee: Lumien Enterprise, Inc., Kennesaw, GA (US)

( * ) Notice: Subject to any disclaimer, the term of this patent is extended or adjusted under 35 U.S.C. 154(b) by 360 days.

(21) Appl. No.: 17/389,017

(22) Filed: Jul. 29, 2021

(65) Prior Publication Data

US 2023/0029871 A1 Feb. 2, 2023

(51) Int. Cl.
| H02G 3/08 | (2006.01) |
| F21V 21/005 | (2006.01) |
| F21V 21/08 | (2006.01) |
| F21V 27/02 | (2006.01) |

(52) U.S. Cl.
CPC ............ *H02G 3/083* (2013.01); *F21V 21/005* (2013.01); *F21V 21/0824* (2013.01); *F21V 27/02* (2013.01)

(58) Field of Classification Search
CPC ...................................................... H02G 3/081
See application file for complete search history.

(56) References Cited

U.S. PATENT DOCUMENTS

| 1,180,658 A | 4/1916 | Kratz |
| 2,668,901 A | 2/1954 | Austin |
| 2,738,756 A | 3/1956 | Doane |
| 3,104,064 A | 9/1963 | Bellek |
| 3,792,753 A | 2/1974 | Smith |
| 4,153,149 A | 5/1979 | Weber |
| 4,164,136 A | 8/1979 | Wiggins et al. |
| 4,186,851 A | 2/1980 | Cantor |
| 4,495,463 A | 1/1985 | Milkovic |
| 4,530,039 A | 7/1985 | Shin-Shi |
| 4,596,449 A | 6/1986 | Iwata et al. |
| 4,739,457 A | 4/1988 | Orr |
| 4,831,664 A | 5/1989 | Suda |
| 4,853,722 A | 8/1989 | Gell, Jr. |
| 4,963,798 A | 10/1990 | McDermott |

(Continued)

FOREIGN PATENT DOCUMENTS

| AE | 445810 | 10/2009 |
| CH | 607571 | 8/1978 |

(Continued)

OTHER PUBLICATIONS

Zhang, Haicheng; Non-Final Office Action for U.S. Appl. No. 16/696,968, filed Aug. 13, 2020, mailed Jan. 19, 2022, 61 pgs.

(Continued)

*Primary Examiner* — Hung V Ngo
(74) *Attorney, Agent, or Firm* — Buchalter

(57) ABSTRACT

A junction box can include an enclosure defining a first enclosure end and a second enclosure end, a cavity extending into the enclosure from the first enclosure end towards the second enclosure end, the first enclosure end defining an opening to the cavity; a mounting insert removably positioned within the opening; and a locking collar removably coupled to the first enclosure end, the locking collar being repositionable on the first enclosure end between a tightened configuration and a loose configuration, the locking collar securing the mounting insert to the enclosure in the tightened configuration.

19 Claims, 9 Drawing Sheets

(56) References Cited

U.S. PATENT DOCUMENTS

| | | |
|---|---|---|
| 4,996,635 A | 2/1991 | Olsson et al. |
| 5,161,883 A | 11/1992 | Gordin et al. |
| 5,249,109 A | 9/1993 | Denison et al. |
| 5,260,858 A | 11/1993 | Maglica |
| 5,319,959 A | 6/1994 | Cooper et al. |
| 5,331,523 A | 7/1994 | Delzer |
| 5,373,427 A | 12/1994 | McLean |
| 5,420,766 A | 5/1995 | Hollis |
| 5,454,611 A | 10/1995 | Wanat |
| 5,513,085 A | 4/1996 | Bourne |
| 5,570,949 A | 11/1996 | Chiang |
| 5,571,278 A | 11/1996 | Chiang |
| 5,584,568 A | 12/1996 | Corbasson et al. |
| 5,690,424 A | 11/1997 | Warshauer |
| 5,825,308 A | 10/1998 | Rosenberg |
| 5,826,971 A | 10/1998 | Kibler |
| 5,904,417 A | 5/1999 | Hewett |
| 5,941,629 A | 8/1999 | Tuscher |
| 5,982,103 A | 11/1999 | Mosebrook et al. |
| D424,731 S | 5/2000 | Landefeld |
| 6,092,914 A | 7/2000 | Esakoff et al. |
| 6,113,252 A | 9/2000 | Arlitt et al. |
| 6,161,948 A | 12/2000 | Hagen |
| 6,290,368 B1 | 9/2001 | Lehrer |
| 6,361,183 B1 | 3/2002 | Maglica |
| 6,390,647 B1 | 5/2002 | Shaefer |
| 6,525,414 B2 | 2/2003 | Shiraishi et al. |
| 6,527,402 B1 | 3/2003 | Borri |
| 6,586,890 B2 | 7/2003 | Min et al. |
| 6,612,720 B1 | 9/2003 | Beadle |
| 6,633,110 B2 | 10/2003 | McGuire et al. |
| 6,641,283 B1 | 11/2003 | Bohler |
| 6,652,113 B2 | 11/2003 | Tant |
| 6,676,270 B2 | 1/2004 | Kostal et al. |
| 6,679,315 B2 | 1/2004 | Cosley et al. |
| 6,748,096 B2 | 6/2004 | Chuang |
| 6,756,663 B2 | 6/2004 | Shiraishi et al. |
| 6,764,197 B1 | 7/2004 | Zemar |
| 6,806,659 B1 | 10/2004 | Mueller et al. |
| 6,874,910 B2 | 4/2005 | Sugimoto et al. |
| 6,883,941 B2 | 4/2005 | Cutting |
| 7,015,825 B2 | 3/2006 | Callahan |
| 7,038,399 B2 | 5/2006 | Lys et al. |
| 7,041,901 B2 | 5/2006 | Case |
| 7,063,553 B1 | 6/2006 | Mullen |
| 7,084,353 B1 | 8/2006 | Downes |
| 7,109,668 B2 | 9/2006 | Pogodayev et al. |
| 7,160,001 B2 | 1/2007 | Bartlett |
| 7,163,313 B2 | 1/2007 | Rosenberg |
| 7,178,937 B2 | 2/2007 | McDermott |
| 7,192,162 B2 | 3/2007 | Tanaka et al. |
| 7,204,608 B2 | 4/2007 | Beeman et al. |
| 7,233,115 B2 | 6/2007 | Lys |
| 7,249,871 B2 | 7/2007 | Chen |
| 7,262,559 B2 | 8/2007 | Tripathi |
| 7,326,179 B1 | 2/2008 | Cienfuegos |
| 7,358,679 B2 | 4/2008 | Lys et al. |
| 7,445,365 B1 | 11/2008 | Hsu |
| 7,452,099 B2 | 11/2008 | Evans et al. |
| 7,513,661 B2 | 4/2009 | Hamada et al. |
| 7,534,975 B1 | 5/2009 | Sarrah et al. |
| 7,547,113 B2 | 6/2009 | Lee |
| 7,549,766 B2 | 6/2009 | Sharrah et al. |
| 7,625,101 B2 | 12/2009 | Alessio |
| 7,722,216 B2 | 5/2010 | Amor et al. |
| 7,733,659 B2 | 6/2010 | Snider et al. |
| 7,736,025 B2 | 6/2010 | Hofmann et al. |
| 7,738,235 B2 | 6/2010 | Gloisten et al. |
| 7,837,866 B2 | 11/2010 | Burrows |
| 7,847,486 B2 | 12/2010 | Ng |
| 7,872,259 B2 | 1/2011 | Den et al. |
| 7,874,717 B1 | 1/2011 | Shaefer |
| 7,896,524 B2 | 3/2011 | Yoneda et al. |
| 7,922,353 B2 | 4/2011 | Isely |
| 8,033,677 B1 | 10/2011 | Olsson et al. |
| 8,066,396 B2 | 11/2011 | Hunt |
| 8,070,328 B1 | 12/2011 | Koble |
| 8,096,674 B2 | 1/2012 | Matthews et al. |
| 8,138,690 B2 | 3/2012 | Chemel et al. |
| 8,148,912 B2 | 4/2012 | Kim |
| 8,162,502 B1 | 4/2012 | Zadro |
| 8,172,434 B1 | 5/2012 | Olsson |
| 8,220,970 B1 | 7/2012 | Khazi et al. |
| 8,235,539 B2 | 8/2012 | Thomas et al. |
| 8,337,049 B2 | 12/2012 | Shida et al. |
| 8,371,894 B1 | 2/2013 | Rosen et al. |
| 8,403,530 B2 | 3/2013 | Singer et al. |
| 8,419,218 B2 | 4/2013 | Dassanayake et al. |
| 8,575,641 B2 | 11/2013 | Zimmerman et al. |
| 8,598,793 B2 | 12/2013 | Yan et al. |
| 8,632,196 B2 | 1/2014 | Tong et al. |
| 8,651,704 B1 | 2/2014 | Gordin et al. |
| 8,662,709 B2 | 3/2014 | Chang |
| 8,704,262 B2 | 4/2014 | Livesay et al. |
| 8,708,535 B2 | 4/2014 | Dalsgaard |
| 8,773,024 B2 | 7/2014 | Yan et al. |
| 8,827,512 B1 | 9/2014 | Beadle |
| 8,882,284 B2 | 11/2014 | Tong et al. |
| 8,905,587 B1 | 12/2014 | Bouckaert |
| 8,919,026 B2 | 12/2014 | Hamilton |
| 8,926,121 B2 | 1/2015 | Wu |
| 8,926,145 B2 | 1/2015 | Lynch et al. |
| 8,931,933 B2 | 1/2015 | Tong et al. |
| 8,936,472 B1 | 1/2015 | Gibboney, Jr. |
| 8,950,895 B2 | 2/2015 | Vinther et al. |
| 8,950,907 B2 | 2/2015 | Packard et al. |
| 8,967,497 B2 | 3/2015 | Luettgen et al. |
| 9,028,086 B2 | 5/2015 | Woo et al. |
| 9,062,830 B2 | 6/2015 | Le et al. |
| 9,115,857 B2 | 8/2015 | Beausoleil |
| 9,140,414 B1 | 9/2015 | Beausoleil |
| 9,140,431 B1 | 9/2015 | Lee |
| 9,168,495 B2 | 10/2015 | Connors |
| 9,169,997 B2 | 10/2015 | Kurt et al. |
| 9,175,814 B2 | 11/2015 | Shida et al. |
| 9,188,292 B2 | 11/2015 | Armer et al. |
| 9,204,519 B2 | 12/2015 | Gan et al. |
| 9,206,964 B2 | 12/2015 | Marsh et al. |
| 9,207,484 B2 | 12/2015 | Hendren et al. |
| 9,210,733 B2 | 12/2015 | Sargent et al. |
| 9,234,655 B2 | 1/2016 | Progl et al. |
| 9,247,597 B2 | 1/2016 | Miskin et al. |
| 9,249,958 B2 | 2/2016 | Schmuckle |
| 9,258,103 B2 | 2/2016 | Van De Ven et al. |
| 9,285,103 B2 | 3/2016 | Van De Ven et al. |
| 9,285,109 B1 | 3/2016 | Olsson et al. |
| 9,306,139 B2 | 4/2016 | Lee et al. |
| 9,310,038 B2 | 4/2016 | Athalye |
| 9,310,059 B2 | 4/2016 | Zhang |
| 9,420,644 B1 | 8/2016 | Shum |
| 9,429,285 B2 | 8/2016 | Shum |
| 9,500,325 B2 | 11/2016 | Tong et al. |
| 9,574,760 B1 | 2/2017 | Olsson et al. |
| 9,595,402 B2 | 3/2017 | Vansickle et al. |
| 9,598,575 B2 | 3/2017 | Bhagwagar |
| 9,614,322 B1 | 4/2017 | Gibboney, Jr. |
| 9,620,096 B2 | 4/2017 | Ambrosino |
| 9,657,930 B2 | 5/2017 | Nolan et al. |
| 9,719,658 B2 | 8/2017 | Maglica et al. |
| 9,730,282 B2 | 8/2017 | Munday et al. |
| 9,739,440 B1 | 8/2017 | Deyaf et al. |
| 9,746,170 B1 | 8/2017 | Armer et al. |
| 9,752,761 B2 | 9/2017 | Lentine |
| 9,777,915 B2 | 10/2017 | Johnson |
| 9,784,417 B1 | 10/2017 | Springer |
| 9,784,440 B2 | 10/2017 | Erdener et al. |
| 9,806,458 B2 | 10/2017 | Chiu et al. |
| 9,863,622 B1 | 1/2018 | Armer et al. |
| 9,915,419 B2 | 3/2018 | Potucek et al. |
| 9,964,286 B1 | 5/2018 | Sooferian |
| 9,995,463 B2 | 6/2018 | Kjeldsen et al. |
| 10,036,535 B2 | 7/2018 | Catalano |
| 10,041,635 B2 | 8/2018 | Lam et al. |
| 10,113,735 B2 | 10/2018 | Emerson et al. |

(56) References Cited

U.S. PATENT DOCUMENTS

| | | |
|---|---|---|
| 10,139,060 B1 | 11/2018 | Erdener et al. |
| 10,190,757 B2 | 1/2019 | Erdener et al. |
| 10,208,935 B2 | 2/2019 | Erdener |
| 10,240,758 B2 | 3/2019 | Maglica |
| 10,323,832 B2 | 6/2019 | Erdener et al. |
| 10,326,220 B1 | 6/2019 | Most et al. |
| 10,330,294 B2 | 6/2019 | Erdener |
| 10,357,146 B2 | 7/2019 | Fiebel et al. |
| 10,359,151 B2 | 7/2019 | Tarsa et al. |
| 10,465,864 B2 | 11/2019 | Leichner |
| 10,509,304 B2 | 12/2019 | Chien |
| 10,612,755 B2 | 4/2020 | Schmuckle et al. |
| 10,682,540 B2 | 6/2020 | Mantione, III |
| 10,704,745 B2 | 7/2020 | Sherry et al. |
| 10,760,773 B2 | 9/2020 | Zhang |
| 10,869,733 B2 | 12/2020 | Learn |
| 10,871,269 B2 | 12/2020 | Li |
| 10,941,924 B2 | 3/2021 | Yu et al. |
| 11,022,298 B2 | 6/2021 | Potucek et al. |
| 11,029,015 B1 | 6/2021 | Olsson et al. |
| 11,035,564 B2 | 6/2021 | Arpin et al. |
| 11,156,330 B2 | 10/2021 | Grandadam |
| 11,162,651 B2 | 11/2021 | Zhang et al. |
| 11,407,362 B1 | 8/2022 | Jordan |
| 11,421,837 B2 | 8/2022 | Zhang et al. |
| 11,466,821 B2 | 10/2022 | Zhang et al. |
| 11,549,674 B2 | 1/2023 | Todaro |
| 11,598,517 B2 | 3/2023 | Zhang |
| 11,959,601 B2 | 4/2024 | Zhang et al. |
| 12,018,828 B2 | 6/2024 | Zhang |
| 2004/0163797 A1 | 8/2004 | Cosley et al. |
| 2005/0007777 A1 | 1/2005 | Klipstein et al. |
| 2005/0135101 A1 | 6/2005 | Richmond |
| 2005/0148241 A1 | 7/2005 | Kohen |
| 2005/0174782 A1 | 8/2005 | Chapman |
| 2005/0255718 A1 | 11/2005 | McLeish |
| 2006/0187653 A1 | 8/2006 | Olsson |
| 2006/0262542 A1 | 11/2006 | Ibbitson et al. |
| 2007/0019415 A1 | 1/2007 | Leblanc et al. |
| 2007/0076415 A1 | 4/2007 | Chou et al. |
| 2007/0139913 A1 | 6/2007 | Savage |
| 2008/0083360 A1 | 4/2008 | Rowley |
| 2008/0123340 A1 | 5/2008 | McClellan |
| 2008/0080187 A1 | 11/2008 | Moss et al. |
| 2008/0273331 A1 | 11/2008 | Moss et al. |
| 2009/0073696 A1 | 3/2009 | Melzner |
| 2009/0205935 A1 | 8/2009 | Frick |
| 2010/0091485 A1 | 4/2010 | Matthews et al. |
| 2010/0127626 A1 | 5/2010 | Altonen et al. |
| 2010/0176750 A1 | 7/2010 | West |
| 2010/0226139 A1 | 9/2010 | Lynch et al. |
| 2010/0259200 A1 | 10/2010 | Beausoleil |
| 2011/0019409 A1 | 1/2011 | Wronski |
| 2011/0048793 A1 | 3/2011 | Ljungren |
| 2011/0075404 A1 | 3/2011 | Allen et al. |
| 2011/0080741 A1 | 4/2011 | Noh |
| 2011/0121752 A1 | 5/2011 | Newman, Jr. et al. |
| 2011/0204777 A1 | 8/2011 | Lenk |
| 2012/0081901 A1 | 4/2012 | Tsang |
| 2012/0091900 A1 | 4/2012 | Fournier |
| 2012/0091917 A1 | 4/2012 | Vinther et al. |
| 2012/0113654 A1 | 5/2012 | Dai |
| 2012/0139426 A1 | 6/2012 | Ilyes et al. |
| 2012/0243213 A1 | 9/2012 | Chen |
| 2012/0243228 A1 | 9/2012 | Olsson et al. |
| 2013/0039055 A1 | 2/2013 | Wilson et al. |
| 2013/0088152 A1 | 4/2013 | Hagen |
| 2013/0114253 A1 | 5/2013 | Segawa et al. |
| 2013/0162139 A1 | 6/2013 | Liu |
| 2013/0208489 A1 | 8/2013 | Schmuckle |
| 2013/0221872 A1 | 8/2013 | Gan et al. |
| 2013/0249437 A1 | 9/2013 | Wang et al. |
| 2013/0331657 A1 | 12/2013 | Basson et al. |
| 2014/0022794 A1 | 1/2014 | Laukkanen |
| 2014/0092593 A1 | 4/2014 | Gordin et al. |
| 2014/0049967 A1 | 5/2014 | Beausoleil |
| 2014/0119022 A1 | 5/2014 | Beausoleil |
| 2014/0198482 A1 | 7/2014 | Yue |
| 2014/0218902 A1 | 8/2014 | Maglica |
| 2014/0256163 A1 | 9/2014 | Kuo |
| 2014/0300285 A1 | 10/2014 | Medak |
| 2014/0334157 A1 | 11/2014 | Ferguson |
| 2014/0375203 A1 | 12/2014 | Goscha et al. |
| 2015/0003050 A1 | 1/2015 | Parsons |
| 2015/0003072 A1 | 1/2015 | Chen et al. |
| 2015/0028776 A1 | 1/2015 | McMillan |
| 2015/0129398 A1 | 5/2015 | Wilkins et al. |
| 2015/0131282 A1 | 5/2015 | Best et al. |
| 2015/0131288 A1 | 5/2015 | Zhang |
| 2015/0153025 A1 | 6/2015 | Wu |
| 2015/0159842 A1 | 6/2015 | Zhang |
| 2015/0167953 A1 | 6/2015 | Huang |
| 2015/0212263 A1 | 7/2015 | Tzeng |
| 2015/0159852 A1 | 9/2015 | Brynjolfsson |
| 2015/0247632 A1 | 9/2015 | McGilvray |
| 2015/0260385 A1 | 9/2015 | Brynjolfsson |
| 2015/0345733 A1 | 12/2015 | Bobbo et al. |
| 2016/0123563 A1 | 5/2016 | Ferguson et al. |
| 2016/0153619 A1 | 6/2016 | Frohnapfel |
| 2016/0201863 A1 | 7/2016 | Kwast et al. |
| 2016/0375163 A1 | 12/2016 | Hawkins et al. |
| 2016/0377280 A1 | 12/2016 | Acampora et al. |
| 2017/0072330 A1 | 3/2017 | Nelson et al. |
| 2017/0085027 A1 | 3/2017 | Ishaug et al. |
| 2017/0108204 A1 | 4/2017 | Wu |
| 2017/0130907 A1 | 5/2017 | Cho et al. |
| 2017/0167695 A1 | 6/2017 | Erdener |
| 2017/0167718 A1 | 6/2017 | Erdener et al. |
| 2017/0171929 A1 | 6/2017 | Erdener et al. |
| 2017/0171932 A1 | 6/2017 | Puvanakijjakorn |
| 2017/0175963 A1 | 6/2017 | Lentine et al. |
| 2017/0219188 A1 | 8/2017 | Veloskey |
| 2017/0311062 A1 | 10/2017 | Garrett et al. |
| 2017/0325311 A1 | 11/2017 | Athalye |
| 2018/0017239 A1 | 1/2018 | Liu et al. |
| 2018/0031215 A1 | 2/2018 | Erdener et al. |
| 2018/0156423 A1 | 6/2018 | Murby |
| 2018/0156445 A1 | 6/2018 | Chen |
| 2018/0306430 A1 | 10/2018 | Weaver et al. |
| 2018/0352121 A1 | 12/2018 | Chapman et al. |
| 2019/0264899 A1 | 8/2019 | Erdener |
| 2020/0063951 A1 | 2/2020 | Yu et al. |
| 2020/0072453 A1* | 3/2020 | Mittal ............... F21V 19/003 |
| 2020/0173630 A1 | 6/2020 | Zhang |
| 2021/0247038 A1 | 8/2021 | Zhang |
| 2021/0356110 A1 | 11/2021 | Zhang |
| 2021/0396362 A1 | 12/2021 | Zhang et al. |
| 2022/0060833 A1 | 2/2022 | Gunn |
| 2022/0082223 A1 | 3/2022 | Zhang et al. |
| 2022/0412517 A1 | 12/2022 | Zhang et al. |
| 2023/0160567 A1 | 5/2023 | Zhang |
| 2023/0324037 A1 | 10/2023 | Zhang |
| 2023/0417401 A1 | 12/2023 | Zhang |
| 2024/0200736 A1 | 6/2024 | Zhang et al. |

FOREIGN PATENT DOCUMENTS

| | | |
|---|---|---|
| CN | 200996560 | 12/2007 |
| CN | 201428965 | 3/2010 |
| CN | 101832493 | 9/2010 |
| CN | 201651985 | 11/2010 |
| CN | 201661934 | 12/2010 |
| CN | 201697032 | 1/2011 |
| CN | 201795292 | 4/2011 |
| CN | 201868044 | 6/2011 |
| CN | 202001978 | 10/2011 |
| CN | 202132720 | 2/2012 |
| CN | 102537788 | 7/2012 |
| CN | 202561568 | 11/2012 |
| CN | 102818171 | 12/2012 |
| CN | 202617421 | 12/2012 |
| CN | 202993068 | 6/2013 |
| CN | 203099444 | 7/2013 |
| CN | 203099944 | 7/2013 |

(56) References Cited

FOREIGN PATENT DOCUMENTS

| | | |
|---|---|---|
| CN | 203115737 | 8/2013 |
| CN | 203131451 | 8/2013 |
| CN | 203215414 | 9/2013 |
| CN | 103335219 | 10/2013 |
| CN | 203223756 | 10/2013 |
| CN | 203225915 | 10/2013 |
| CN | 203375353 | 1/2014 |
| CN | 203573985 | 4/2014 |
| CN | 303021758 | 12/2014 |
| CN | 104315460 | 1/2015 |
| CN | 104595757 | 5/2015 |
| CN | 204313074 | 5/2015 |
| CN | 105114878 | 12/2015 |
| CN | 204973611 | 1/2016 |
| CN | 105526521 | 4/2016 |
| CN | 105889771 | 8/2016 |
| CN | 205979248 | 2/2017 |
| CN | 206207184 | 5/2017 |
| CN | 206429994 | 8/2017 |
| CN | 206817297 | 12/2017 |
| CN | 207486634 | 6/2018 |
| CN | 109140397 | 1/2019 |
| CN | 109578834 | 4/2019 |
| CN | 110056825 | 7/2019 |
| CN | 110332485 | 10/2019 |
| CN | 209587772 | 11/2019 |
| CN | 209726016 | 12/2019 |
| CN | 209762834 | 12/2019 |
| CN | 210319700 | 4/2020 |
| DE | 19620209 | 11/1997 |
| DE | 10006410 | 8/2001 |
| DE | 202006006481 | 6/2006 |
| DE | 202014008377 | 10/2014 |
| EP | 1034690 | 10/2003 |
| EP | 0929993 | 10/2004 |
| GB | 2418979 | 4/2006 |
| GB | 2523802 | 9/2015 |
| HK | 1198615 | 4/2015 |
| JP | 3673943 | 7/2005 |
| JP | 3875392 | 1/2007 |
| JP | 4590283 | 12/2010 |
| JP | 2011165394 | 8/2011 |
| JP | 2012014980 | 1/2012 |
| JP | 4894688 | 3/2012 |
| JP | 5124978 | 1/2013 |
| JP | 5354209 | 11/2013 |
| JP | 2013254665 | 12/2013 |
| JP | 2014157795 | 8/2014 |
| JP | 2015076304 | 4/2015 |
| JP | 6182417 | 8/2017 |
| JP | 6473927 | 2/2019 |
| KR | 20120135003 | 12/2012 |
| KR | 101420351 | 7/2014 |
| KR | 20150009880 | 1/2015 |
| KR | 20150021814 | 3/2015 |
| KR | 101676019 | 11/2016 |
| KR | 101677730 | 11/2016 |
| KR | 101937643 | 1/2019 |
| KR | 101957884 | 3/2019 |
| RU | 2358354 | 6/2009 |
| TW | 330233 | 4/1998 |
| TW | M295720 | 8/2006 |
| TW | 201205901 | 2/2012 |
| TW | I391600 | 4/2013 |
| TW | M481324 | 7/2014 |
| WO | 2002084750 | 10/2002 |
| WO | 2008049405 | 5/2008 |
| WO | 2010021675 | 2/2010 |
| WO | 2011143510 | 11/2011 |
| WO | 2013021940 | 2/2013 |
| WO | 2013024557 | 2/2013 |
| WO | 2011065047 | 4/2013 |
| WO | 2013184166 | 12/2013 |
| WO | 2014108870 | 7/2014 |
| WO | 2015070150 | 5/2015 |
| WO | 2015162600 | 10/2015 |
| WO | 2019100448 | 5/2019 |
| WO | 2021134806 | 7/2021 |
| WO | 2021212541 | 10/2021 |

OTHER PUBLICATIONS

Zhang, Haicheng; International Search Report and Written Opinion for PCT/CN2020/088127, filed Apr. 30, 2020, mailed Jan. 4, 2021, 8 pgs.

Zhang, Haicheng; Notice of Allowance for U.S. Appl. No. 17/463,086, filed Aug. 31, 2021, mailed Jun. 2, 2022, 20 pgs.

Zhang, Haicheng; Notice of Allowance for U.S. Appl. No. 16/969,968, filed Aug. 13, 2020, mailed Apr. 18, 2022, 17 pgs.

Jiangsu Sur Lighting Co., Ltd.; Office Action for Chinese patent application No. 2017111950586, filed Nov. 24, 2017, mailed Aug. 29, 2023, 9 pgs.

Zhang, Haicheng; Final Office Action for U.S. Appl. No. 17/389,019, filed Jul. 29, 2021, mailed Aug. 5, 2022, 23 pgs.

Zhang, Haicheng; Non-Final Office Action for U.S. Appl. No. 17/895,557, filed Aug. 25, 2022, mailed Jun. 21, 2023, 64 pgs.

Zhang, Haicheng; Non-Final Office Action for U.S. Appl. No. 18/100,300, filed Jan. 23, 2023, mailed Jun. 21, 2023, 64 pgs.

Zhang, Haicheng; Notice of Allowance for U.S. Appl. No. 17/389,019, filed Jul. 29, 2021, mailed Oct. 24, 2022, 11 pgs.

Zhang, Haicheng; International Preliminary Report on Patentability for PCT/CN2020/088127, filed Apr. 30, 2020, mailed Nov. 3, 2022, 11 pgs.

Zhang, Haicheng; Non-Final Office Action for U.S. Appl. No. 17/463,086, filed Aug. 31, 2021, mailed Feb. 15, 2022, 61 pgs.

Zhang, Haicheng; Non-Final Office Action for U.S. Appl. No. 17/389,019, filed Jul. 29, 2021, mailed Feb. 15, 2022, 65 pgs.

Haicheng, Zhang; Search Report for Chinese patent application No. 201911420142.2, filed Dec. 31, 2019, mailed May 12, 2020, 2 pgs.

ANSI; Article entitled: "Degrees of Protection Provided by Enclosures (IP Code)", NFMA Standards Publication, Copyright 2004, 27 pgs.

Article labeled: "Philips CP5 Concrete Pour Kit ("CP5")", Low Voltage Inground Lighting; On sale, described in a printed publication, and/or in public use at least as early as 2011, 1 pg.

Hadco; Installation Instructions: CP2, CP3, CP4 & CP5 Accessories, Copyright 2018, 2 pgs.

Keeping, Steven; Article entitled: "LED Packaging and Efficacy Advances Boost Lumen Density", located at <https://www.digikey.com/en/articles/led-packaging-and-efficacy-advances-boost-lumen-density>, published on Jan. 14, 2014, 5 pgs.

Keeping, Steven; Article entitled: "The Rise of Chip-on-Board LED Modules", located at <https://www.digikey.com/en/articles/the-rise-of-chip-on-board-led-modules>, published on Mar. 11, 2014, 5 pgs.

LEDs Magazine; Article entitled: "Controlling LED lighting systems: introducing the LED Driver", located at <https://www.ledsmagazine.com/architectural-lighting/retail-hospitality/article/16701402/controlling-led-lighting-systems-introducing-the-led-driver>, published Dec. 10, 2004, 11 pgs.

Linear Artwork, Inc.; Brochure or LA8303 Driver, published Jun. 11, 2009, 20 pgs.

NKK Switches; Design Guide for the '90s, Catalog No. 9405, Published Jan. 1994, 21 pgs.

NNO Innotech Co. Ltd; LA8303 Driver Specification, published Mar. 7, 2013, 20 pgs.

Philips Hadco; Brochure for FlexScape LED, Published 2015, 12 pgs.

Philips Landscape; Brochure for Luminaire Smart Service Guide, published Oct. 2014, 28 pgs.

Philips; Brochure for "BL9 Flexscape LED Accent Landscape Luminaire", Copyright 2014, 3 pgs.

Philips; Installation Instructions IL9 Inground, Copyright 2014, 2 pgs.

Philips; Installation Instructions: BL9 Accent, Copyright 2014, 4 pgs.

Pratt, Charles, Encyclopedia of Electronic Components vol. 1, Copyright 2013, 302 pgs.

(56) References Cited

OTHER PUBLICATIONS

Pratt, Charles, Encyclopedia of Electronic Components vol. 2, Copyright 2015, 316 pgs.
Spectrol Electronics Corporation; Spectrol Short Form Catalog, Copyright 1966, 13 pgs.
Zhang, Haicheng; Notice of Allowance for U.S. Appl. No. 16/645,458, filed Jan. 25, 2021, mailed Jun. 16, 2021, 14 pgs.
Zhang, Haicheng; Notice of Allowance for U.S. Appl. No. 16/645,458, filed Jan. 25, 2021, mailed Sep. 27, 2021, 42 pgs.
Zhang, Haicheng; Non-Final Office Action for U.S. Appl. No. 16/086,562, filed Sep. 19, 2018, mailed Mar. 18, 2020, 12 pgs.
Zhang, Haicheng; Notice of Allowance for U.S. Appl. No. 16/086,562, filed Sep. 19, 2018, mailed Jul. 8, 2020, 8 pgs.
Haicheng, Zhang; Office Action for Chinese patent application No. 201911420142.2, filed Dec. 31, 2019, mailed May 20, 2020, 9 pgs.
Zhang, Haicheng; International Search Report and Written Opinion for PCT/CN2020/070502, filed Jan. 6, 2020, mailed Aug. 27, 2020, 8 pgs.
Zhang, Haicheng; International Preliminary Report on Patentability for PCT/CN2017/115006, filed Dec. 7, 2017, mailed May 26, 2020, 9 pgs.
Zhang, Haicheng; International Search Report and Written Opinion for PCT/CN2017/115006, filed Dec. 7, 2017, mailed Aug. 17, 2018, 14 pgs.
Zhang, Haicheng; Notice of Allowance for U.S. Appl. No. 18/100,300, filed Jan. 23, 2023, mailed Apr. 1, 2024, 12 pgs.
Zhang, Haicheng; Requirement for Restriction/Election for U.S. Appl. No. 18/210,631, filed May 24, 2023, mailed Mar. 5, 2024, 8 pgs.
Zhang, Haicheng; Notice of Allowance for U.S. Appl. No. 17/895,557, filed Aug. 25, 2022, mailed Dec. 7, 2023, 16 pgs.
Zhang, Haicheng; Final Office Action for U.S. Appl. No. 18/100,300, filed Jan. 23, 2023, mailed Dec. 7, 2023, 28 pgs.
Zhang, Haicheng; Non-Final Office Action for U.S. Appl. No. 18/201,631, filed May 24, 2023, mailed May 22, 2024, 66 pgs.
Zhang, Haicheng; Non-Final Office Action for U.S. Appl. No. 18/243,329, filed Sep. 7, 2023, mailed Jun. 17, 2024, 79 pgs.
Zhang, Haicheng; Office Action for Chinese patent application No. 20171195058.6, filed Nov. 24, 2017, mailed Apr. 29, 2024, 9 pgs.
Zhang, Haicheng; Notice of Allowance for U.S. Appl. No. 18/201,631, dated Nov. 1, 2024, 16 pgs.
Non-Final Office Action for U.S. Appl. No. 18/593,654, dated Dec. 4, 2024, 68 pgs.
Notice of Allowance for U.S. Appl. No. 18/243,329, dated Nov. 27, 2024, 12 pgs.

\* cited by examiner

JUNCTION BOX

TECHNICAL FIELD

This disclosure relates to a junction box. More specifically, this disclosure relates to a re-indexable threaded junction box.

BACKGROUND

Commonly, junction boxes are used to contain and protect electrical connections, such as for the installation of lighting, fans, and other appliances. For indoor electrical applications, electrical cables can be pulled and junction boxes are commonly mounted within walls, floors, and ceilings in a process often referred to as "rough in" installation. Rough in typically occurs after the structure has been framed for indoor structures or after completion of geotechnical work for outdoor structures. For example, in a house, junction boxes are commonly secured to studs and joists of the frame during rough in installation. Once roughed in, ground (or flooring), wall, and ceiling surfaces can be installed around the junction boxes for indoor structures, such as the installation of subflooring and flooring materials, drywall, tile, wood paneling, or other materials. For outdoor structures, concrete, cement, or various other types of fill materials may be poured around the junction boxes. At this point, the rotational indexing of the junction box relative to the surrounding surface, such as a wall, ceiling, floor, or ground surface, can be difficult or impossible to change, for practical purposes.

Some junction boxes can utilize threaded connections to attach fixtures, such as light fixtures. For example, the junction box can include a hole with female threads, and a portion of the light fixture can define male threads, such as a threaded shaft, which can be threaded into the junction box to secure the fixture to the junction box. The indexing, or timing, of the threads is generally not standardized in a way that allows installers to predict the orientation of the fixture when it is fully threaded into the junction box. For example, a wall light, or sconce, such as an uplight, downlight, lantern, or candlelight, is typically intended to be installed in a particular orientation, such as an uplight facing upwards or a downlight facing downwards. Depending on how a threaded junction box was positioned when roughed in, an uplight fixture may end up facing downwards, sideways, or in a diagonal direction, when the fixture is threaded completely into the junction box, which can be aesthetically undesirable.

Because it is generally not practical to reindex, or retime, the junction box within the structure, the light fixture must be unscrewed from the junction box until it is in the desired orientation and then the light fixture must be rotationally secured by some other means, such as with a set screw or jam nut. These solutions generally leave a portion of the threads exposed and do not provide an aesthetically pleasing appearance. Another possible solution is that the fixture can be completely unscrewed from the junction box and shims can be installed between the fixture and the junction box, which can be a time-consuming trial-and-error process to achieve the correct orientation. In either solution, the distance that the light fixtures stick out from the junction box can vary slightly, which can be noticeable, particularly when fixtures are positioned close together.

In some electrical fixtures, the fixture's cables can extend through the threaded stub shaft of the fixture. Before screwing the fixture into the threaded junction box, the electrical cables within the structure must be connected to the electrical cables of the fixture, and then the fixture can be threaded into the junction box. As the fixture is rotated while threading the fixture into the junction box, the cables are twisted, which can compromise the electrical connections and result in the fixture not working once installed.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a junction box comprising an enclosure defining a first enclosure end and a second enclosure end, a cavity extending into the enclosure from the first enclosure end towards the second enclosure end, the first enclosure end defining an opening to the cavity; a mounting insert removably positioned within the opening; and a locking collar removably coupled to the first enclosure end, the locking collar being repositionable on the first enclosure end between a tightened configuration and a loose configuration, the locking collar securing the mounting insert to the enclosure in the tightened configuration.

Also disclosed is a junction box assembly comprising an electrical fixture; a junction box comprising an enclosure defining a first enclosure end and a second enclosure end, the enclosure defining an enclosure axis extending from the first enclosure end to the second enclosure end, the first enclosure end defining an opening to a cavity of the enclosure; a mounting insert removably positioned within the opening, the electrical fixture mounted to the mounting insert, the electrical fixture being rotationally fixed to the mounting insert; and a locking collar removably coupled to the first enclosure end, the locking collar repositionable between a tightened configuration and a loose configuration; and wherein the mounting insert is rotatable about the enclosure axis relative to the enclosure when the locking collar is in the loose configuration; and wherein the mounting insert is rotationally fixed to the enclosure about the enclosure axis when the locking collar is in the loose configuration.

Also disclosed is a method for mounting an electrical fixture to a junction box, the method comprising inserting a threaded shaft of the electrical fixture through a locking collar of the junction box; screwing a mounting insert of the junction box onto the threaded shaft until the mounting insert is securely mounted to the threaded shaft; inserting the mounting insert into an opening of an enclosure of the junction box; rotationally indexing the mounting insert and the electrical fixture to a first rotational position relative to the enclosure; and positioning the locking collar in a tightened configuration on the enclosure to rotationally fix the locking collar to the enclosure.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
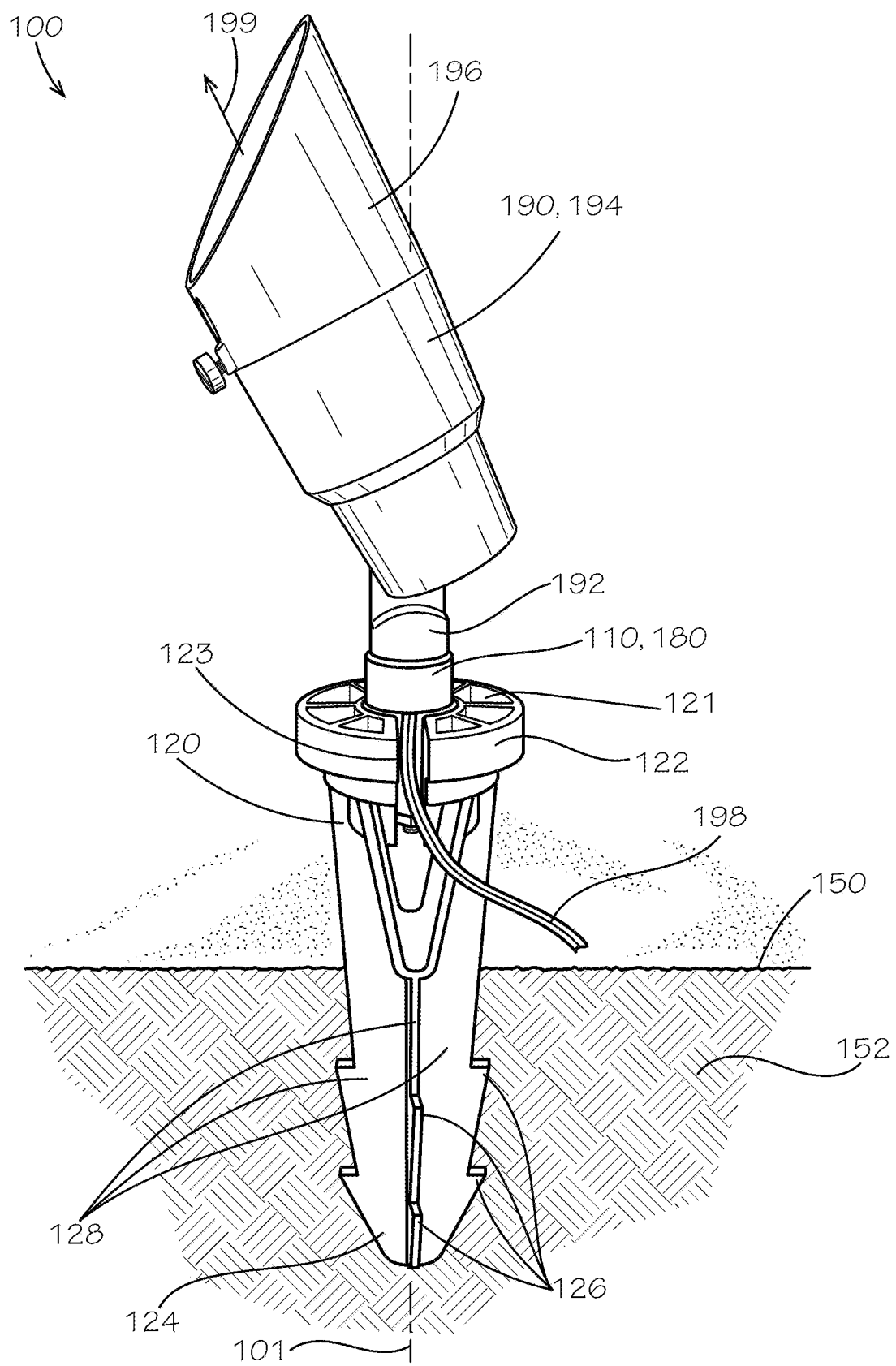
FIG. 1 is a side perspective view of a junction box assembly comprising a junction box, a stake, and an electrical fixture in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a junction box assembly and associated methods, systems, devices, and various apparatus. The junction box assembly can comprise an electrical fixture, a junction box, a stake, and a power cable. It would be understood by one of skill in the art that the disclosed junction box assembly is described in but a few exemplary aspects among many. No particular terminology or description should be considered limiting on the disclosure or the scope of any claims issuing therefrom.

FIG. 1 is a side perspective view of a junction box assembly 100 comprising a junction box 110, a stake 120, and an electrical fixture 190 in accordance with one aspect of the present disclosure.

The stake 120 can comprise an upper portion 122 and a lower portion 124. The stake 120 can be configured to be driven into a ground surface 150 with the lower portion 124 stabbed into the ground 152 below the ground surface 150. In some aspects, the stake 120 can define a plurality of vanes, or fins, 128. The vanes 128 can minimize an end cross-section of the stake 120, which can help the stake 120 to easily penetrate into the ground 152; however, the vanes 128 can also provide a large side cross-section, which can provide a large engagement area between the ground 152 and the stake 120 to better resist side loads and moments on the stake 120, such as if the stake 120 is bumped into by a person, lawn mower, or other object, for example and without limitation. The stake 120 can define a plurality of barbs 126. The barbs 126 can aid in resisting upward forces acting on the stake 120, such as to prevent tampering with the junction box assembly 100 for example and without limitation. In some aspects, the barbs 126 can be defined on the vanes 128.

The upper portion 122 can be configured to receive and coupled with the junction box 110, as shown. In the present aspect, the junction box 110 can be set into the upper portion 122, as described in greater detail with respect to FIG. 2. The upper portion 122 can be reinforced and configured to withstand repeated blows, such as from a hammer or mallet. The stake 120 can be driven into the ground surface 150 by hammering, pressing, or otherwise exerting force on a top end 121 of the upper portion 122. In the aspect shown, the upper portion 122 can define a cable passage, or stake cable passage, 123. The cable passage 123 can receive a fixture cable 198 of the electrical fixture 190 or a separate power cable 800 (shown in FIG. 8), as discussed in greater detail with respect to FIGS. 8 and 9 below. In some aspects, the fixture cable 198 can extend through a shaft 192 of the electrical fixture 190 to the junction box 110.

In the present aspect, the electrical fixture 190 can be a light; however, in some aspects, the electrical fixture 190 can be a different electrical fixture, such as a speaker, fan, laser, sign, holiday decoration, or any other suitable device. In the aspect shown, the light can be an outdoor spotlight, such as a D6B1-aW as sold by Lumien Lighting of Kennesaw, Georgia in the United States. The electrical fixture 190 can comprise the shaft 192 and a main enclosure 194. The main enclosure 194 can be configured to emit light in a first direction 199. In the present aspect, the electrical fixture 190 can comprise a shroud 196 to direct the light in the first direction 199. In some aspects, the main enclosure 194 can be tiltable relative to the shaft 192, such as to change an elevation angle of the first direction 199 relative to the ground surface 150.

The shaft 192 can be mounted, or coupled, to the junction box 110. A locking collar 180 of the junction box 110 is shown in a tightened configuration. With the locking collar 180 in the tightened configuration, the electrical fixture 190 can be rotationally fixed relative to an enclosure 240 (shown in FIG. 2) of the junction box 110. As described below in greater detail with respect to FIGS. 3 and 4, the junction box 110 can be configured to reindex, or rotate, the electrical fixture 190 relative to the enclosure 240 about an enclosure axis 101 of the junction box 110 when the locking collar 180 is placed in a loose configuration, as shown and described with respect to FIGS. 3 and 4.

Figure 2:
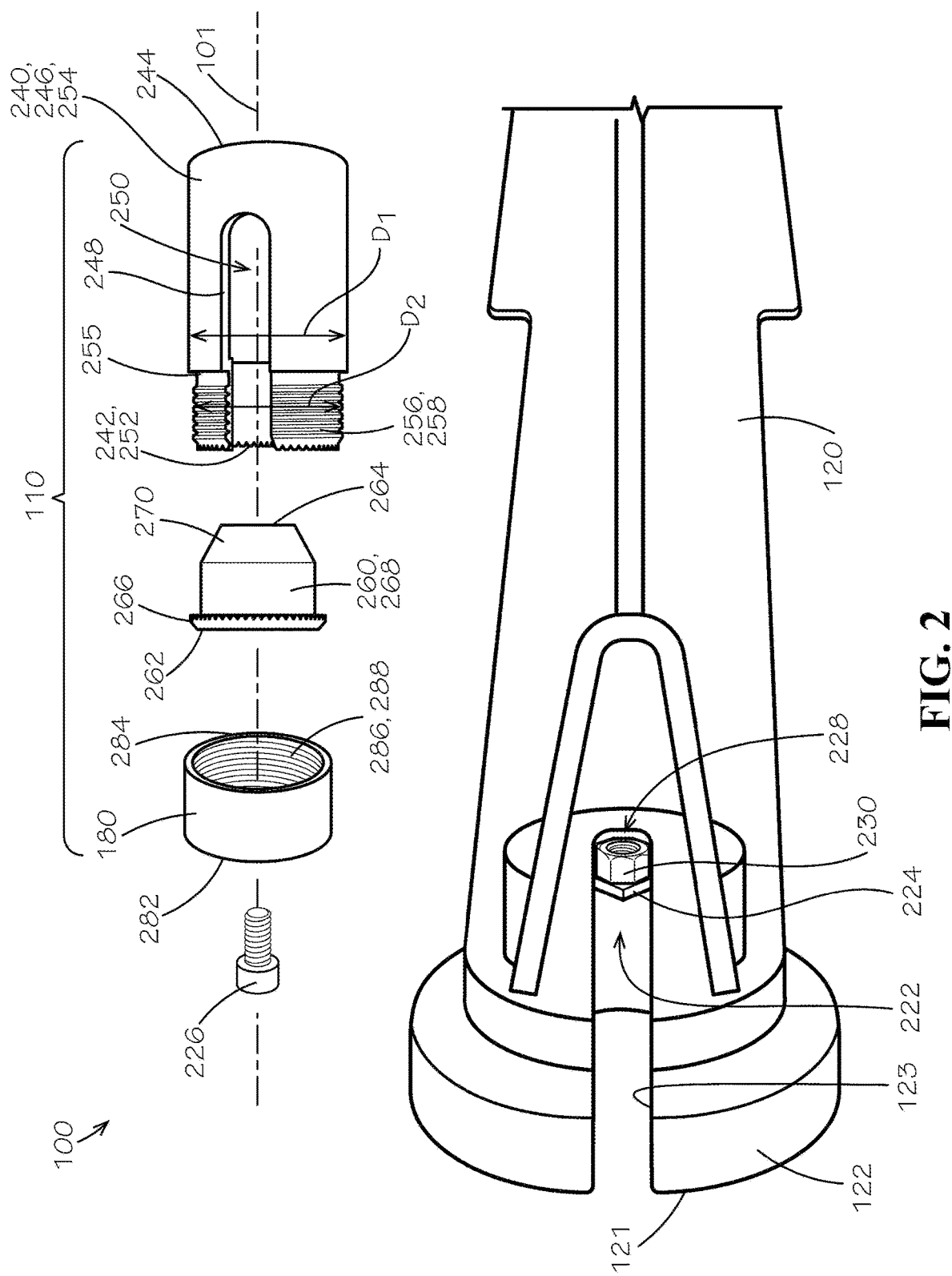
FIG. 2 is a side view of the junction box and the stake of the junction box assembly of FIG. 1 in an exploded configuration.

FIG. 2 is a side view of the junction box 110 and the stake 120 of the junction box assembly 100 of FIG. 1, shown in an exploded configuration. Specifically, the junction box 110 is shown removed from the stake 120, and the junction box 110 is shown exploded along the enclosure axis 101 of the enclosure 240.

The junction box 110 can comprise the enclosure 240, a mounting insert 260, and the locking collar 180.

The enclosure 240 can define a first enclosure end 242 and a second enclosure end 244, positioned opposite from the first enclosure end 242. The enclosure axis 101 can extend from the first enclosure end 242 to the second enclosure end 244. The enclosure 240 can define a sidewall 246 extending between the first enclosure end 242 and the second enclosure end 244. In some aspects, the enclosure 240 can define an enclosure cable passage 248. As shown through the enclosure cable passage 248, the enclosure 240 can define a cavity 250 extending into the enclosure from the first enclosure end 242 towards the second enclosure end 244. An opening 252 to the cavity 250 can be defined by the enclosure 240 at the first enclosure end 242.

The enclosure cable passage 248 can extend through the sidewall 246 and/or a bottom wall 340 (shown in FIG. 3) of the enclosure 240 to the cavity 250. In the aspect shown, the enclosure cable passage 248 can extend through the sidewall 246 from the first enclosure end 242 towards the second enclosure end 244. In some aspects, the enclosure cable passage 248 may not extend to the first enclosure end 242 and the opening 252. In such aspects, the enclosure cable passage 248 may be fully encircled by the sidewall 246.

The enclosure 240 can define a main portion 254, a reduced shoulder 255, and a reduced portion 256. The reduced shoulder 255 can be positioned between the main portion 254 and the reduced portion 256. The reduced shoulder 255 can step down in size, such as diameter, from the main portion 254 to the reduced portion 256. The reduced portion 256 can extend from the first enclosure end 242 to the reduced shoulder 255. The main portion 254 can extend from the reduced shoulder 255 to the second enclosure end 244. The main portion 254 can define a diameter $D_1$, and the reduced portion 256 can define a diameter $D_2$. The diameter $D_2$ can be smaller than the diameter $D_1$. The enclosure 240 can define threading, or enclosure threading, 258. In some aspects, the enclosure threading 258 can be external threading, as shown. In some aspects, the enclosure threading 258 can be internal threading. In the present aspect, the enclosure threading 258 can be defined by the reduced portion 256. The enclosure threading 258 can extend from the first enclosure end 242 towards or to the reduced shoulder 255.

The mounting insert 260 can define a first insert end 262 and a second insert end 264, positioned opposite from the first insert end 262. In the present aspect, the mounting insert 260 can be elongated with a substantially tubular shape. The mounting insert 260 can define a lip 266 at or adjacent to the first insert end 262. In the present aspect, the lip 266 can extend continuously around a perimeter, such as a circumference, of the first insert end 262. A main body 268 of the mounting insert 260 can extend from the lip 266 to the second insert end 264. The main body 268 can be at least partially sized complimentary to the opening 252 so that the main body 268 can be at least partially inserted into the cavity 250 through the opening 252. In the present aspect, the lip 266 can be sized so that the lip 266 and the first insert end 262 engage the first enclosure end 242 and prevent the first insert end 262 from entering into the opening 252; however, in some aspects, the first insert end 262 can be sized to fit within the opening 252, as discussed below in greater detail. In the present aspect, the main body 268 can define a transition surface 270, such as a fillet, chamfer, or bevel for example and without limitation, and the transition surface 270 can taper down in outer diameter at the second insert end 264 to facilitate the insertion of the main body 268 through the opening 252.

The locking collar 180 can define a first collar end 282 and a second collar end 284, positioned opposite from the first collar end 282. A collar bore 286 can extend through the locking collar 180 from the first collar end 282 to the second collar end 284. The locking collar 180 can be sized and configured to threadedly engage the enclosure 240. In the aspect shown, the collar bore 286 can be internally threaded with collar threading 288. The collar threading 288 can be complimentarily formed to the enclosure threading 258.

Turning to the stake 120, the upper portion 122 can define a stake bore 222, as shown through the cable passage 123. The stake bore 222 can extend into the top end 121 of the stake 120 to an internal wall 224 of the stake 120. The stake bore 222 can be sized to receive the enclosure 240. Specifically, the stake bore 222 can be sized to receive the second enclosure end 244 of the enclosure 240. In the present aspect, the stake 120 can be configured to receive a fastener 226 to secure the bottom wall 340 (shown in FIG. 3) of the enclosure 240 to the internal wall 224 of the stake 120. In the present aspect, the stake 120 can define a depression 228, such as a groove, pocket, or hole, which can receive and retain a complimentary fastener 230, such as a nut in the present aspect. The fastener 226 can be inserted through the bottom wall 340 and the internal wall 224 and engaged with the complimentary fastener 230 to couple, or mount, the enclosure 240 to the stake 120. In some aspects, the stake 120 and the fastener 226 can be configured to couple the enclosure 240 to the stake 120 without a complimentary fastener. For example and without limitation, the stake 120 can define a tapped hole, or the fastener 226 can define barbs, ribs, or other features configured to retain the fastener 226 in the stake 120 once inserted. In some aspects, the enclosure 240 and stake 120 can define complimentary threading, and the enclosure 240 can be threadedly coupled to the stake 120.

Figure 3:
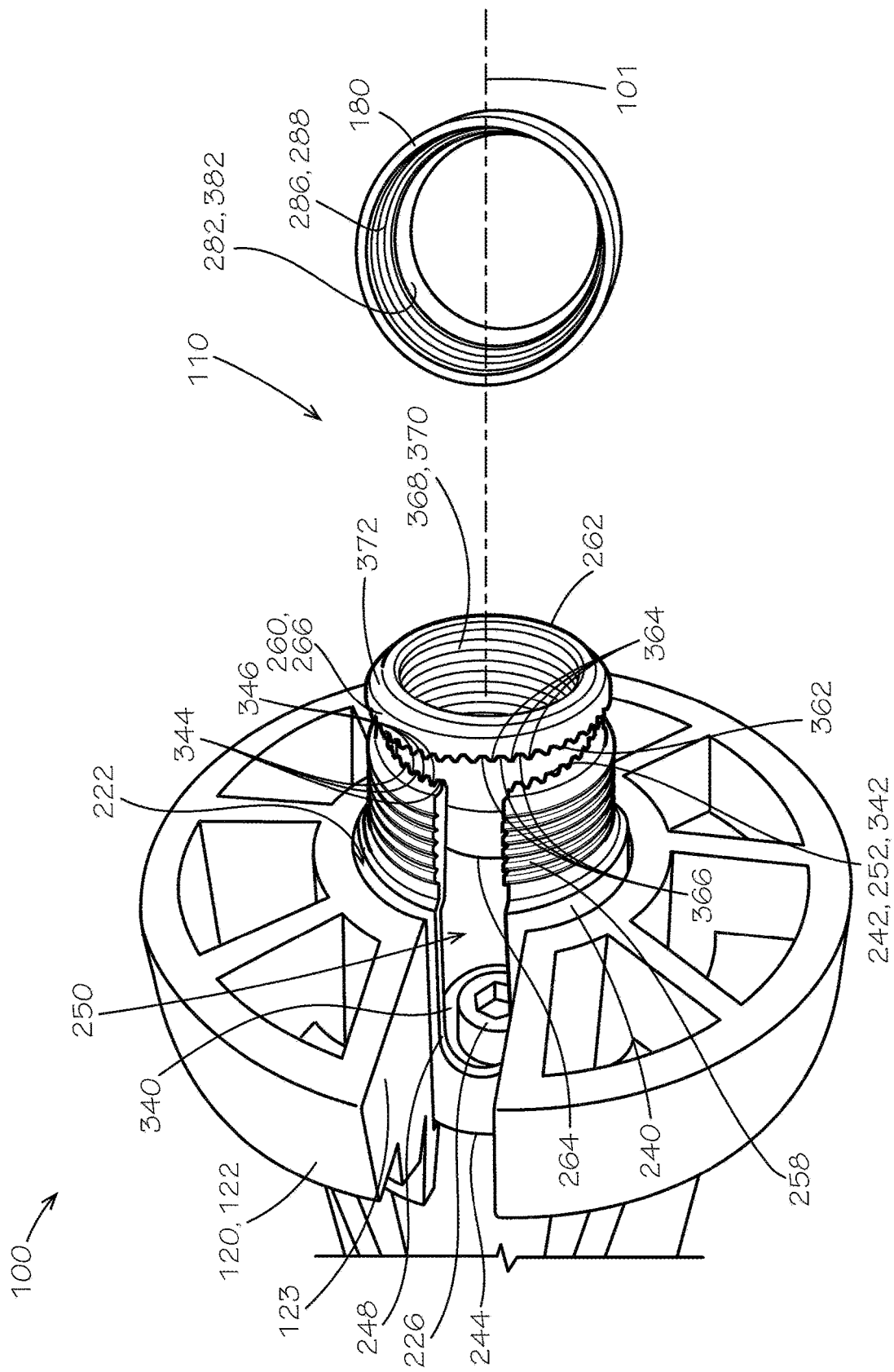
FIG. 3 is a top perspective view of the junction box and an upper portion of the stake of FIG. 1 with an enclosure of the junction box mounted to the stake, and the junction box shown in a partially disassembled state.

FIG. 3 is a top perspective view of the junction box 110 and the upper portion 122 of the stake 120 of the junction box assembly 100 of FIG. 1 with the enclosure 240 of the junction box 110 mounted to the stake 120, and the junction box 110 shown in a partially disassembled state. The enclosure 240 can be positioned within the stake bore 222 and secured with the fastener 226, as similarly discussed above. The stake 120 and the enclosure 240 can define complimentary indexing features configured to index the enclosure 240 relative to the stake 120 so that the enclosure cable passage 248 can be aligned with the stake cable passage 123. Alignment of the enclosure cable passage 248 with the stake cable passage 123 can provide access through the stake 120 to the cavity 250, such as for running cables to or from the junction box 110.

The enclosure 240 can define an enclosure engagement structure 342. In the present aspect, the enclosure engagement structure 342 can be defined at the first enclosure end 242. In some aspects, the enclosure engagement structure 342 can be defined between the first enclosure end 242 and the second enclosure end 244. For example and without limitation, in some aspects, the enclosure engagement structure 342 can be positioned between the first enclosure end 242 and the second enclosure end 244, such as being positioned on a countersunk shoulder (not shown) below the opening 252. The enclosure engagement structure 342 can extended partially or completely around the opening 252.

In some aspects, the enclosure engagement structure 342 can comprise at least one protuberance 344, such as at least one tooth, lug, or other suitable structure. In some aspects, the enclosure engagement structure 342 can define at least one groove, or notch, 346. In some aspects, at least one groove 346 can be defined between a pair of adjacent protuberances 344. In some aspects, the enclosure engagement structure 342 may not comprise any protuberances 344. In some aspects, at least one groove 346 can be defined extending into the first enclosure end 242.

The mounting insert 260 can define an insert engagement structure 362. The insert engagement structure 362 can be defined complimentary to the enclosure engagement structure 342. In some aspects, the insert engagement structure 362 can comprise at least one protuberance 364, such as at least one tooth, lug, or other suitable structure. In some aspects, the insertion engagement structure 362 can define at least one groove 366. In some aspects, at least one groove, or notch, 366 can be defined between a pair of adjacent protuberances 364. In the present aspect, the insert engagement structure 362 can be defined by the lip 266. The insert engagement structure 362 can face the second insert end 264, and when the second insert end 264 is inserted into the cavity 250, the insert engagement structure 362 can face the enclosure engagement structure 342.

In some aspects, the enclosure engagement structure 342 can be defined at the first insert end 262. For example and without limitation, the lip 266 can at least partially define, or be, the insert engagement structure 362. As noted above, in some aspects, the lip 266 can comprise at least one protuberance, or protrusion, spaced circumferentially around the first insert end 262. In some aspects, the at least one protuberance, or protrusion can extend outwards from the first insert end 262. For example and without limitation, the at least one protuberance can extend outwards in a radial direction with respect to the enclosure axis 101. In such aspects, the first insert end 262 can define an end shaped similar to a spur gear. The at least one protuberance 364 can be received by the at least one groove, or notch, 346 of the enclosure engagement structure 342.

The mounting insert 260 can define an insert bore 368 extending through the mounting insert 260 from the first insert end 262 to the second insert end 264. The mounting insert 260 can define insert threading 370. In the present aspect, the insert threading 370 can be defined within the insert bore 368, and the insert threading 370 can be female threading.

In FIG. 3, the mounting insert 260 is shown positioned in a disengaged position within the opening 252. In the disengaged position, the insert engagement structure 362 can be disengaged from the enclosure engagement structure 342, and the mounting insert 260 can be rotatable, or re-indexable, about the enclosure axis 101 relative to the enclosure 240. For example, the respective protuberances 344,364 of each engagement structure 342,362 can be axially spaced apart from the grooves 346,366 of the other engagement structure 342,362, with respect to the enclosure axis 101.

With the locking collar 180 in a loose configuration, as shown, the mounting insert 260 can be axially repositioned along the enclosure axis 101 between the disengaged position, as shown, and an engaged position, as shown and described with respect to FIG. 4 below. In the present aspect, the mounting insert 260 can be sized complimentary to the cavity 250 so that the enclosure 240 can guide the mounting insert 260 as the mounting insert 260 slides between the disengaged position and the engaged position. The loose configuration can refer to when the locking collar 180 is completely detached from the enclosure 240 (as shown) and/or when the locking collar 180 is loosely positioned on the first enclosure end 242 to provide adequate clearance for the mounting insert 260 to be in the disengaged position. For example, the loose configuration can encompass when the first enclosure end 242 is received within the collar bore 286 with the collar threading 288 engaging the enclosure threading 258, while the locking collar 180 is sufficiently loosened, or backed off, to provide sufficient clearance to place the mounting insert 260 in the disengaged position.

The locking collar 180 can be placed in the tightened configuration by engaging the collar threading 288 with the enclosure threading 258 and rotating the locking collar 180 about the enclosure axis 101 relative to the enclosure 240 until the locking collar 180 is tightened against the enclosure 240. In the tightened configuration, the locking collar 180 can secure the mounting insert 260 in the engaged position, shown in FIG. 4. In regards to an exemplary sequence, the mounting insert 260 can first be placed in the engaged position, and the locking collar 180 can then be tightened, or the locking collar 180 can be tightened with the mounting insert 260 in the disengaged position, which can place the mounting insert 260 into the engaged position once the locking collar 180 is tightened to the tightened configuration, for example and without limitation.

The locking collar 180 can define an inner lip 382 at the first collar end 282. The inner lip 382 can extend inwards within the collar bore 286 relative to the collar threading 288. The inner lip 382 can be sized to prevent the mounting insert 260 from passing completely through the collar bore 286. In the present aspect, the mounting insert 260 can define a relieved shoulder 372 extending from the first insert end 262 towards the second insert end 264. In the present aspect, the relieved shoulder 372 can be defined by the lip 266. The inner lip 382 of the locking collar 180 can be sized and shaped to engage with the relieved shoulder 372, rather than the first insert end 262, so that when the locking collar 180 is in the tightened configuration, the first insert end 262 can protrude outwards from the collar bore 286 beyond the first collar end 282. In some aspects, the first collar end 282 and the first insert end 262 can be positioned flush with one another when the locking collar 180 is in the tightened configuration. In some aspects, the first insert end 262 can be recessed into the collar bore 286, below the first collar end 282, when the locking collar 180 is in the tightened configuration.

Figure 4:
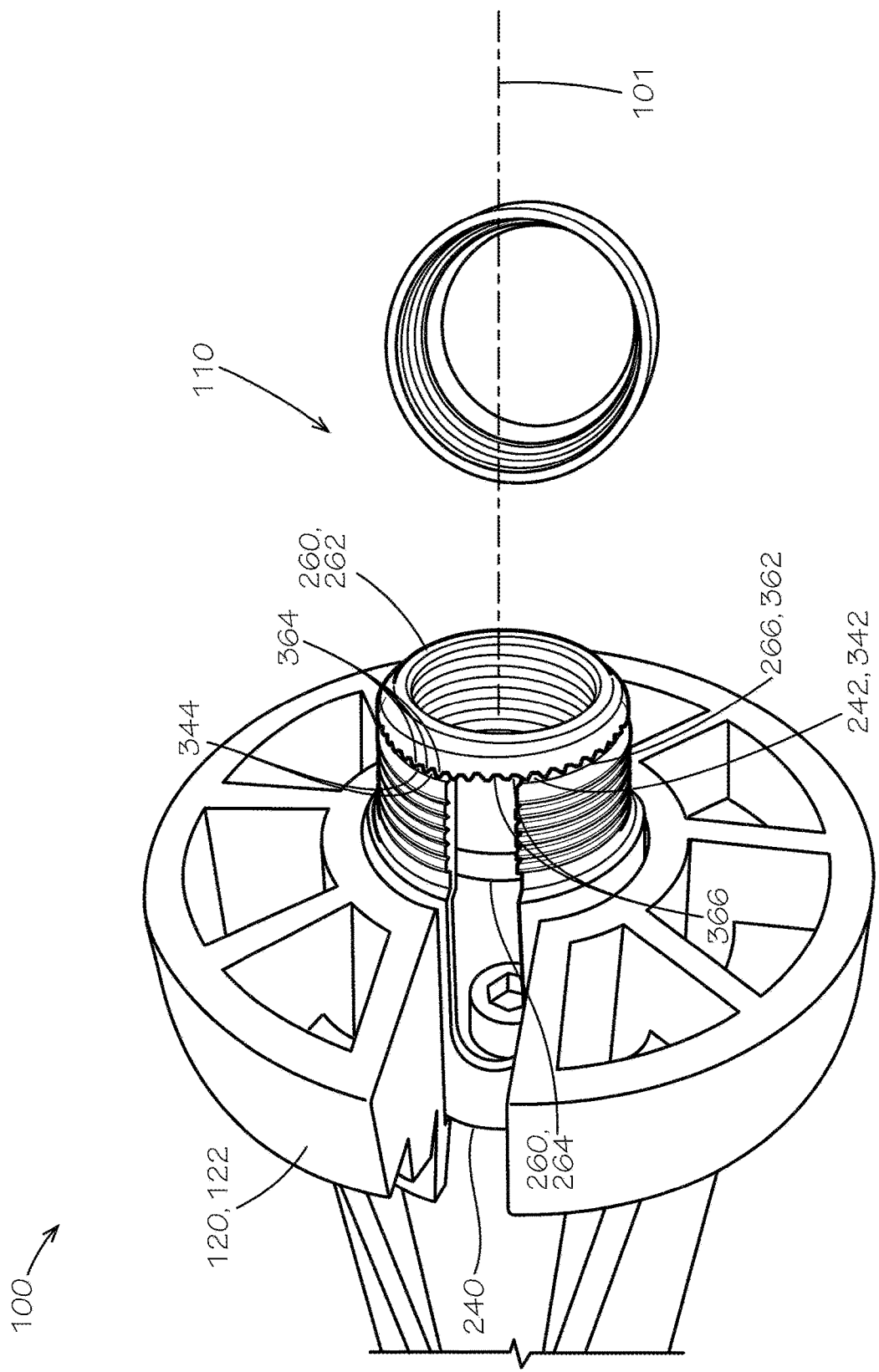
FIG. 4 is a top perspective view of the junction box and the upper portion of the stake of the junction box assembly of FIG. 1 with the enclosure of the junction box mounted to the stake, and the junction box shown in a partially disassembled state.

FIG. 4 is a top perspective view of the junction box 110 and the upper portion 122 of the stake 120 of the junction box assembly 100 of FIG. 1 with the enclosure 240 of the junction box 110 mounted to the stake 120, and the junction box 110 in a partially disassembled state. The mounting insert 260 is shown in the engaged position. In the engaged position, the insert engagement structure 362 can engage with the enclosure engagement structure 342 to rotationally fix the mounting insert 260 to the enclosure 240 about the enclosure axis 101. In the aspect shown, the at least one groove 366 of the mounting insert 260 can receive the at least one protuberance 344 of the enclosure 240, and the at least one groove 346 (shown in FIG. 3) of the enclosure 240 can receive the at least one protuberance 364 of the mounting insert 260.

In the present aspect, the lip 266 can be positioned atop the first enclosure end 242 when the mounting insert 260 is in the engaged position. The first enclosure end 242 can be axially positioned between the first insert end 262 and the second insert end 264, relative to the enclosure axis 101. In other aspects, the first insert end 262 can be positioned flush with or below the first enclosure end 242.

Figure 5:
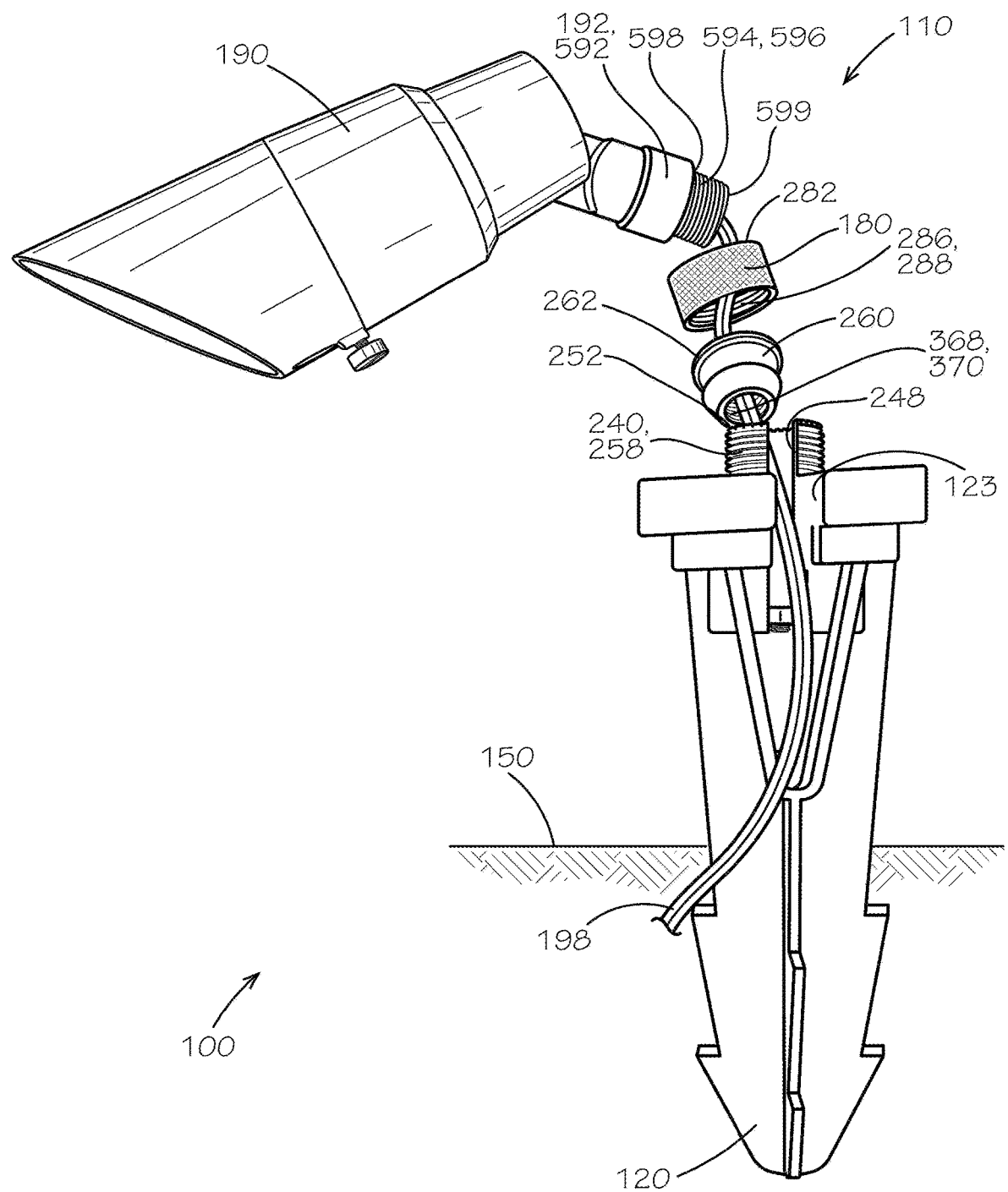
FIG. 5 is a side view of the junction box assembly of FIG. 1 in a partially assembled state with the stake stabbed into a ground surface.

FIG. 5 is a side view of the junction box assembly 100 of FIG. 1 in a partially assembled state with the stake 120 stabbed into the ground surface 150. In the present aspect, the electrical fixture 190 can comprise the fixture cable 198, which can extend through the shaft 192. In the present aspect, the shaft 192 can be a threaded shaft, and the shaft 192 can define shaft threading 596. The shaft 192 can define a main portion 592, a reduced shoulder 598, and a reduced portion 594. The reduced shoulder 598 can step down in size, such as diameter, from the main portion 592 to the reduced portion 594. The reduced portion 594 can define the shaft threading 596. In the present aspect, the shaft threading 596 can extend from an end 599 of the shaft 192 towards or to the reduced shoulder 598.

To assemble the junction box assembly 100, the fixture cable 198 can be threaded through the collar bore 286 of the locking collar 180 and the insert bore 368 of the mounting insert 260. The reduced portion 594 of the shaft 192 can be inserted through the collar bore 286 of the locking collar 180, and the insert threading 370 can be threadedly engaged with the shaft threading 596. The mounting insert 260 can then be rotated and tightened onto the shaft 192 until the mounting insert 260 is snuggly tightened, or torqued, to the shaft 192, as shown and discussed below with respect to FIG. 7.

In the context of the mounting insert 260 and the electrical fixture 190, the mounting insert 260 can be understood as being rotationally fixed to the electrical fixture 190 when the mounting insert 260 has been fully tightened onto the shaft 192, even though the mounting insert 260 may not be rotationally fixed in an absolute sense because it can be screwed back off the shaft 192 by exceeding a breaking torque threshold of the threaded connection between the shaft threading 596 and the insert threading 370. For example the mounting insert 260 can be tightened until the first insert end 262 engages the reduced shoulder 598, and friction between the first insert end 262 and the reduced shoulder 598 can secure the mounting insert 260 relative to the shaft 192. However, during regular use, the junction box assembly 100 is not subjected to substantial loads, and it can be sufficient to hand-tighten the various threaded connections of the junction box assembly 100 of FIG. 1 to rotationally fix components to one another. Relative to the minimal loads anticipated during use of the junction box assembly 100, the mounting insert 260 can be understood to be rotationally fixed to the electrical fixture 190 when hand-tightened to the electrical fixture 190 because the mounting insert 260 and the electrical fixture 190 can rotate together when indexing and/or reindexing the electrical fixture 190 relative to the enclosure 240. In some aspects, the mounting insert 260 can comprise a set screw 700 (shown in FIG. 7), which can be engaged with the shaft 192 to further rotationally fix the mounting insert 260 to the electrical fixture 190, as similarly disclosed in FIGS. 7 and 9, below.

In the present aspect, once the mounting insert 260 is tightened onto the shaft 192, the locking collar 180 can be captured, or coupled, between the mounting insert 260 and the reduced shoulder 598; however, the locking collar 180 can remain rotatable relative to the mounting insert 260 and the shaft 192. The first collar end 282 can be sized so that the locking collar 180 cannot slip over the mounting insert 260. In some aspects, the first insert end 262 can be positioned in facing engagement with the reduced shoulder 598 when the mounting insert 260 is tightened to the shaft 192. In some aspects, an entirety of the shaft threading 596 can be inserted through the insert bore 368 such that none of the shaft threading 596 is positioned, or exposed, between the first insert end 262 and the reduced shoulder 598, which can be the case when the first insert end 262 is positioned in facing engagement with the reduced shoulder 598.

With the mounting insert 260 rotationally fixed to the electrical fixture 190, the mounting insert 260 can be inserted into the enclosure 240, and the mounting insert 260 and the electrical fixture 190 can indexed relative to the enclosure 240 and the stake 120. In the aspect shown, the fixture cable 198 can be a relatively long cable, which can be run back to a power junction or a power cable. In such aspects, the fixture cable 198 can be run through the stake cable passage 123 and the enclosure cable passage 248 before stabbing the mounting insert 260 into the enclosure 240. In aspects wherein the fixture cable 198 is connected to a separate power cable, such as the power cable 800 of FIG. 8, the power cable can be pulled through the stake cable passage 123 and the enclosure cable passage 248, and the connection between the fixture cable 198 and the power cable can be positioned within the enclosure 240 before inserting the mounting insert 260 into the enclosure 240.

Once the mounting insert 260 is inserted into the enclosure 240 and the mounting insert 260 and electrical fixture 190 are rotationally indexed relative to the stake 120 and the enclosure 240 as desired, the locking collar 180 can be threadedly tightened via threaded engagement between the collar threading 288 and the enclosure threading 258 until the locking collar 180 is snugly tightened, such as hand-tightened, to the enclosure 240 in the tightened configuration. With the locking collar 180 in the tightened configuration, as shown in FIG. 1, the mounting insert 260 can be secured in the engaged position, shown in FIG. 4, thereby rotationally fixing the mounting insert 260 and the electrical fixture 190 to the enclosure 240 and the stake 120. If a user later desires to reindex the electrical fixture 190, the locking collar 180 can be loosened to the loose configuration. The electrical fixture 190 and the mounting insert 260 can then be reindexed, or rotated, relative to the enclosure 240 and the stake 120. The locking collar 180 can then be tightened back down to the tightened configuration to rotationally secure the electrical fixture 190 and the mounting insert 260 in the new rotational position relative to the enclosure 240 and the stake 120.

Figure 6:
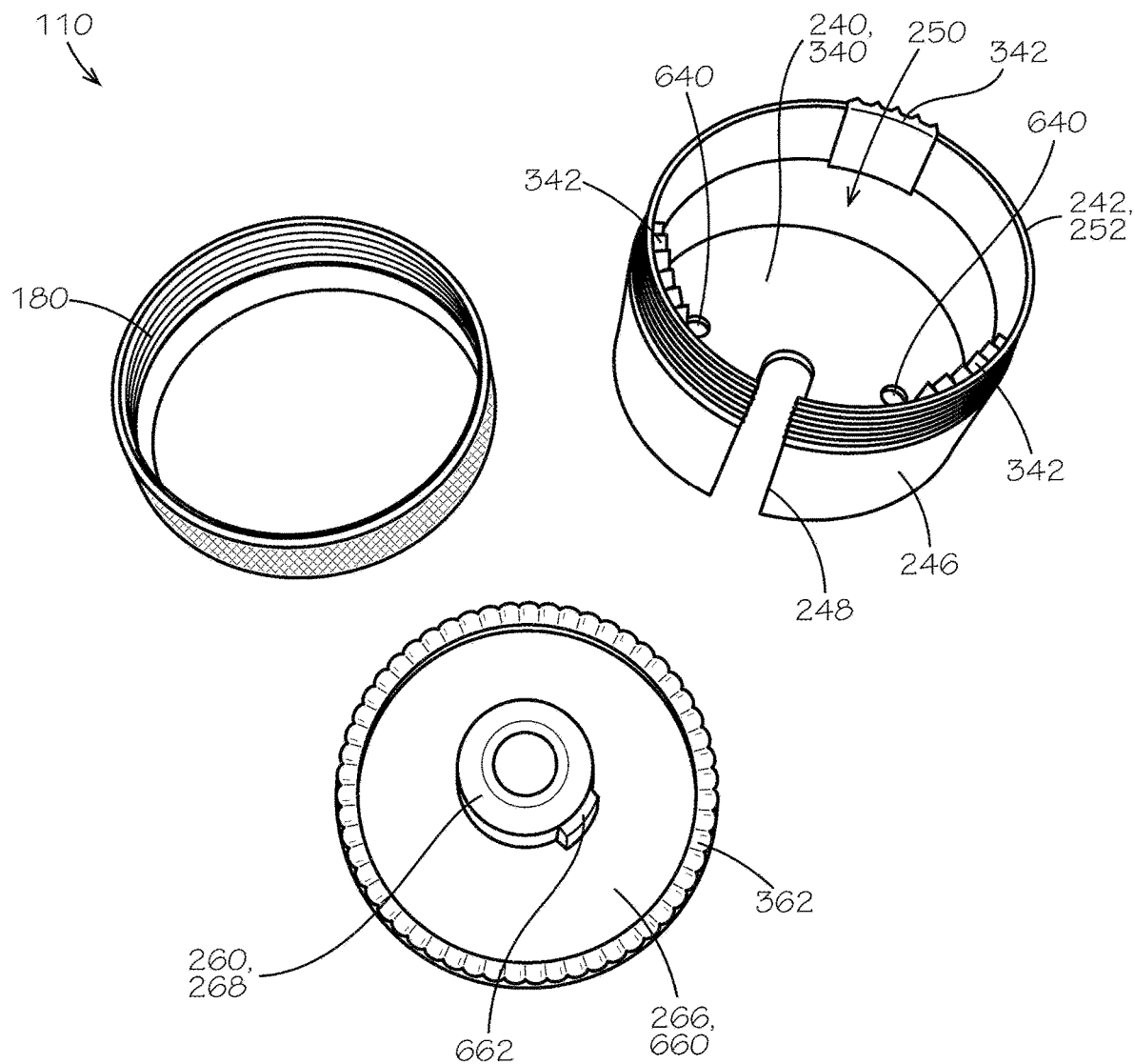
FIG. 6 is a top view of another aspect of the junction box, shown in a disassembled state, in accordance with another aspect of the present disclosure.

FIG. 6 is a top view of another aspect of the junction box 110 in accordance with another aspect of the present disclosure. The junction box 110 of FIG. 6 can be configured to be mounted, or installed, into a structure, such as a wall, ceiling, floor, concrete slab, or other structure, as described in greater detail below with respect to FIG. 9.

The enclosure 240 can define at least one mounting hole 640. In the present aspect, the enclosure 240 can define a plurality of mounting holes 640. Each mounting hole 640 can be configured to receive a fastener, such as a screw, nail, bolt, rivet, or other suitable fastener, to mount the enclosure 240 to a structure. In the present aspect, one or more of the mounting holes 640 can be defined extending through the bottom wall 340 of the enclosure 240. The enclosure cable passage 248 can extend through the sidewall 246 as well as the bottom wall 340, which can provide clearance for a cable, such as the fixture cable 198 (shown in FIG. 1) to enter the cavity 250 through the side or rear of the enclosure 240. In some aspects, the enclosure cable passage 248 can only extend through the bottom wall 340 or the sidewall 246, rather than through both.

In the present aspect, the enclosure engagement structure 342 can be spaced around the opening 252 at the first enclosure end 242. In some aspects, the enclosure engagement structure 342 can extend continuously around the opening 252.

In the present aspect, the main body 268 of the mounting insert 260 can be sized significantly smaller than the opening 252 of the cavity 250. The lip 266 can be enlarged to define a flange 660. The insert engagement structure 362 can extend around a perimeter, such as a circumference for example and without limitation, of the lip 266 and flange 660. In the present aspect, the insert engagement structure 362 can be radially spaced apart from the main body 268. The main body 268 can define a screw boss 662, which can be configured to receive the set screw 700 (shown in FIG. 7). The locking collar 180 can be sized to receive the lip 266, which can be the flange 660.

Figure 7:
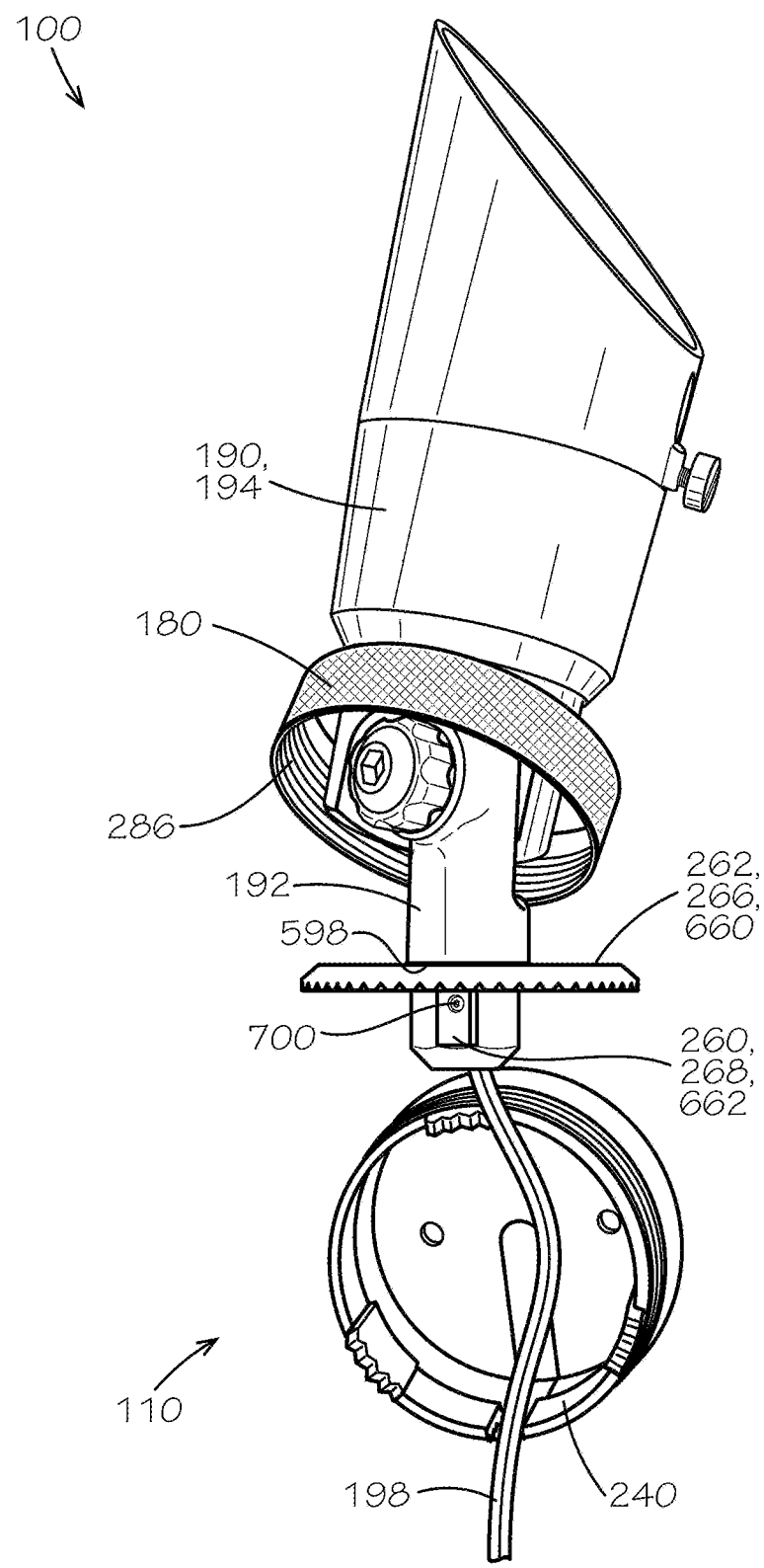
FIG. 7 is a side view of another aspect of the junction box assembly comprising the electrical fixture of FIG. 1 and the junction box of FIG. 6.

FIG. 7 is a side view of another aspect of the junction box assembly 100 comprising the electrical fixture 190 of FIG. 1 and the junction box 110 of FIG. 6. The mounting insert 260 is shown tightened and rotationally fixed to the shaft 192. The shaft threading 596 (shown in FIG. 5) can be fully received within the mounting insert 260. Threaded engagement between the shaft threading 596 and the insert threading 368 (shown in FIG. 3) can snugly position the first insert end 262, and the lip 266 and/or the flange 660, in facing engagement with the shoulder 598 to rotationally fix the mounting insert 260 to the electrical fixture 190. The set screw 700 can be threaded into the screw boss 662 of the main body 268 until the set screw 700 engages the shaft threading 596 (shown in FIG. 5), thereby further rotationally securing, or fixing, the mounting insert 260 to the electrical fixture 190. In some aspects, the first insert end 262 may not contact the shoulder 598 when the mounting insert 260 is rotationally fixed to the electrical fixture 190. For example and without limitation, a washer, such as a lock washer, a seal, a shim, an escutcheon plate, or another body can be positioned between the first insert end 262 and the shoulder 598 when the mounting insert 260 is tightened onto the shaft 192. In such aspects, the first insert end 262 can be indirectly engaged with the shoulder 598 to rotationally fix the mounting insert 260 to the fixture 190. In some aspects, the set screw 700 can rotationally fix the mounting insert 260 to the shaft 192 without directly or indirectly engaging the first insert end 262 with the shoulder 598.

In the present aspect, the collar bore 286 of the locking collar 180 can be sized larger than the shoulder 598. The collar bore 286 may not be captured between the mounting insert 260 and the shoulder 598 when the mounting insert 260 is rotationally fixed to the shaft 192. In some aspects, such as where the main enclosure 194 of the electrical fixture 190 is small in size, the locking collar 180 can be slipped on and off over the electrical fixture 190 with the mounting insert 260 rotationally fixed to the electrical fixture 190. In such aspects, the mounting insert 260 can be rotationally fixed to the shaft 192 without first threading the fixture cable 198 through the locking collar 180. In some aspects, the locking collar 180 can be configured to cover the mounting insert 260. For example and without limitation, the locking collar 180 can be formed similar to an escutcheon plate with an aesthetic appearance complimentary to that of the fixture 190. In such aspects, a portion of the locking collar 180 can fit closely around the shaft 192.

Once the mounting insert 260 is rotationally fixed to the electrical fixture 190, the mounting insert 260 can be placed on, or inserted into, the enclosure 240. The locking collar 180 can be tightened to the enclosure 240 to secure, or rotationally fix, the mounting insert 260 and the electrical fixture 190 to the enclosure 240.

Figure 8:
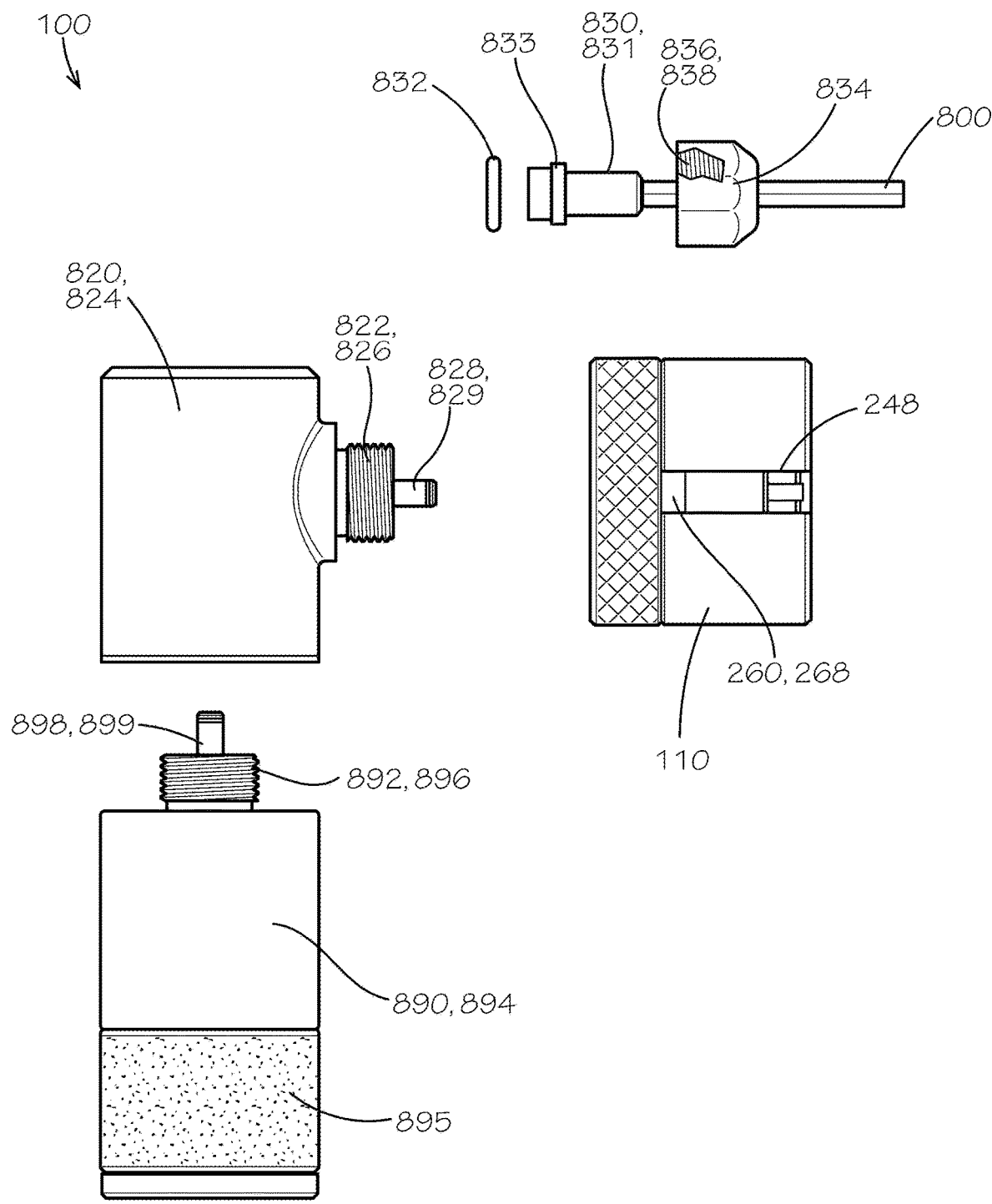
FIG. 8 is a side view of another aspect of the junction box assembly comprising the junction box of FIG. 6, a power cable, a conduit, and an electrical fixture in accordance with various aspects of the present disclosure.

FIG. 8 is a side view of another aspect of the junction box assembly 100 comprising the junction box 110 of FIG. 6, the power cable 800, a conduit 820, and an electrical fixture 890 in accordance with another aspect of the present disclosure.

The power cable 800 can comprise a cable rotatable electrical connector 830. In the present aspect, the cable rotatable electrical connector 830 can be a female rotatable electrical connector 831. The cable rotatable electrical connector 830 can define a retention structure 833, such as a rib, lug(s), threading, barb(s), or any other suitable structure. The power cable 800 can optionally comprise a cable collar 834. The cable collar 834 can define a cable collar bore 836 (shown in partial cutaway). The cable collar bore 836 can define cable collar threading 838. In the present aspect, the cable collar threading 838 can be female threading.

The electrical fixture 890 can be a light fixture, such as a lamp for example and without limitation, in the present aspect. The electrical fixture 890 can comprise an accessory 895, such as a shroud, globe, lens, cover, or other component configure to direct, diffuse, tint, or otherwise alter light emitted by the electrical fixture 890. The electrical fixture 890 can comprise a main enclosure 894 and a shaft 892. In the present aspect, the shaft 892 can be rigidly coupled to the main enclosure 894, such as by being integrally formed therewith, for example and without limitation. In some aspects, the shaft 892 can be adjustable relative to the main enclosure 894, such as to be tiltable for example and without limitation. The shaft 892 can define shaft threading 896, which can be male threading in the present aspect. The electrical fixture 890 can comprise a fixture rotatable electrical connector 898. In the present aspect, the fixture rotatable electrical connector 898 can be a male rotatable electrical connector 899.

The junction box assembly 100 can optionally comprise one or more conduits 820. In the present aspect, the conduit 820 can be an elbow conduit, or elbow fitting; however, in other aspects, the conduit 820 can be a different type of conduit, or fitting, such as a cable, a tee-shaped fitting, a y-shaped fitting, a straight conduit, or any other type of connector or fitting. In some aspects, such as where the conduit 820 is a tee-shaped fitting or another type of branched fitting, the conduit 820 can be configured to connect to multiple light fixtures 890. In the present aspect, the conduit 820 can comprise a main enclosure 824 and a shaft 822. In the present aspect, the shaft 822 can be rigidly coupled to the main enclosure 824, such as by being integrally formed therewith, for example and without limitation. In some aspects, the shaft 822 can be adjustable relative to the main enclosure 824, such as to be tiltable for example and without limitation. The shaft 822 can define shaft threading 826, which can be male threading in the present aspect. The conduit 820 can comprise a conduit rotatable electrical connector 828. In the present aspect, the conduit rotatable electrical connector 828 can be a male rotatable electrical connector 829. The conduit 820 can comprise a female threaded portion (not shown) within the main enclosure 824, and a female rotatable electrical connector (not shown), similar to the female rotatable electrical connector 831, can be disposed within the female threaded portion.

To assemble the junction box assembly 100, the shaft 892 of the electrical fixture 890 can be threaded into the female threaded portion of the conduit 820. Threadedly coupling the electrical fixture 890 with the conduit 820 can electrically connect the male rotatable electrical connector 899 with the female rotatable electrical connector positioned within the female threaded portion.

The shaft 822 of the conduit 820 can be threaded into the mounting insert 260 (shown through enclosure cable passage 248). The power cable 800 can be inserted into the junction box 110 through the enclosure cable passage 248. The female rotatable electrical connector 831 can be electrically connected to the male rotatable electrical connector 829 through one of a variety of ways, and in aspects comprising a seal 832, the seal 832 can seal between the male rotatable electrical connector 829 and the female rotatable electrical connector 831. In some aspects, the seal 832 can comprise an elastomeric material, such as a rubber or some polymers. In some aspects, the seal 832 can be a gasket, an O-ring, or another type of suitable seal. For example and without limitation, the male rotatable electrical connector 829 can extend through the main body 268 of the mounting insert 260, and the female rotatable electrical connector 831 can be slipped onto the male rotatable electrical connector 829. In some aspects, at least a portion of the shaft threading 826 can extend through the main body 268 of the mounting insert 260, and the cable collar 834 can be threadedly engaged with the shaft 822 to secure the rotatable electrical connectors 829,831 together. In some aspects, at least a portion of the main body 268 of the mounting insert 260 can define male threading (not shown), and the cable collar 834 can be threadedly engaged with the main body 268 to secure the rotatable electrical connectors 829,831 together. In some aspects, the main body 268 of the mounting insert can engage with the retention structure 833 to secure the female rotatable electrical connector 831 to the mounting insert 260, as discussed in greater detail with respect to FIG. 9. In such aspects, threadedly coupling the shaft 822 to the mounting insert 260 can electrically connect the male rotatable electrical connector 899 with the female rotatable electrical connector 831. Power from the power cable 800 can be routed through the conduit 820 to the electrical fixture 890 via the rotatable electrical connections.

In some aspects, rather than threading the conduit 820 into the junction box 110, the electrical fixture 890 can be threaded directly into the junction box 110 as desired. In some aspects, the rotatable electrical connectors 830,828, 898 can be reversed so that the male rotatable electrical connectors can be female rotatable electrical connectors, and the female rotatable electrical connectors can be male rotatable electrical connectors.

Figure 9:
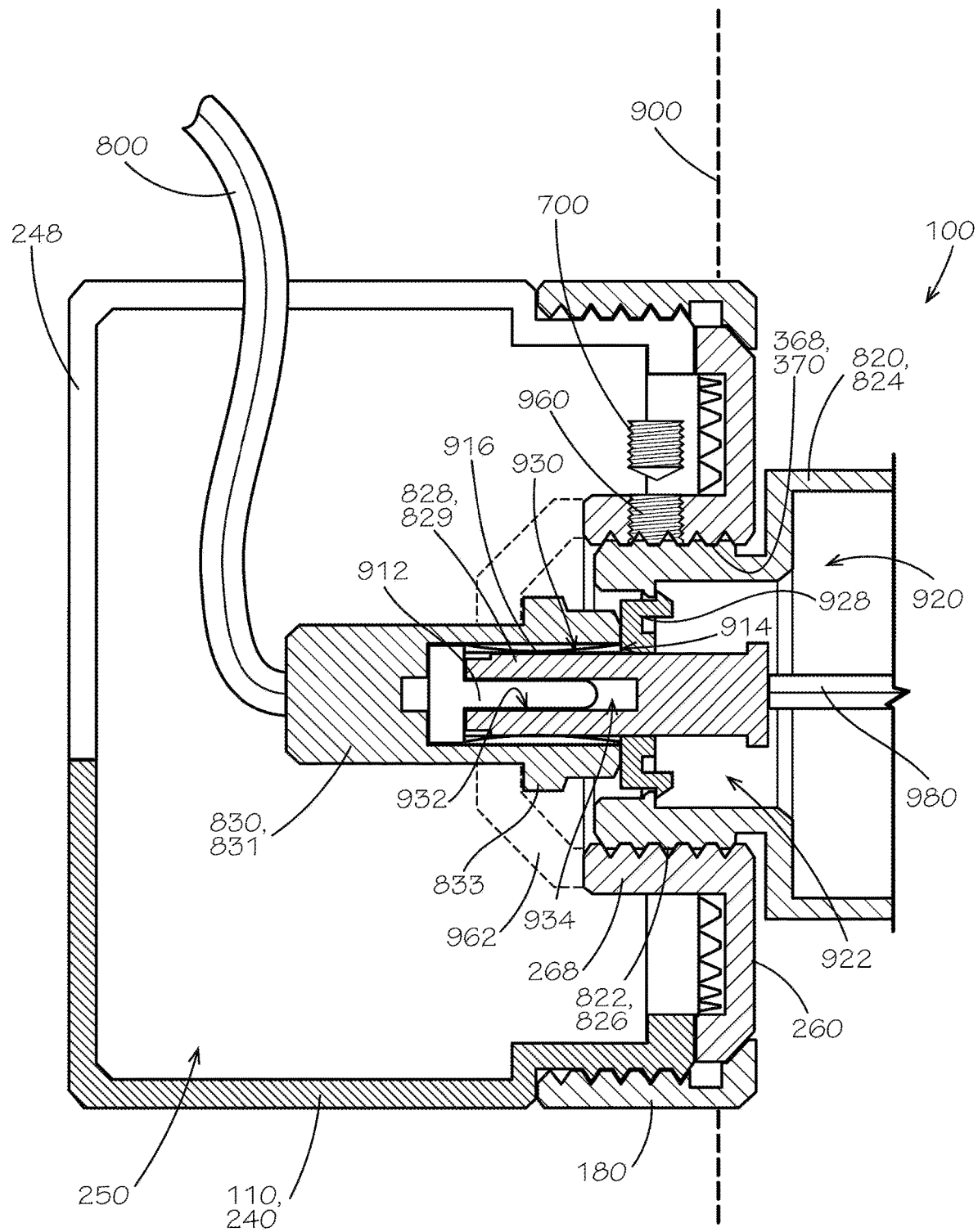
FIG. 9 is a partial cross-sectional view of the junction box assembly of FIG. 8.

FIG. 9 is a partial cross-sectional view of the junction box assembly 100 of FIG. 8. As shown, the junction box 110 can be set into a surface 900. For example, the surface 900 can be a wall, a ceiling, a floor, a concrete pad, or any other structure, and the junction box 110 can be set into the structure so that the junction box 110 can be approximately flush with the surface 900.

In the present aspect, a partial cross-section of the shaft 822 of the conduit 820 is shown, which can also be representative of the shaft 892 of the electrical fixture 890 (shaft 892 and electrical fixture 890 shown in FIG. 8). The main enclosure 824 can define a cavity 920. The shaft 822 can define a shaft bore 922. The shaft bore 922 can be in communication with the cavity 920. As described above, the conduit rotatable electrical connector 828 can be the male rotatable electrical connector 829. The conduit rotatable electrical connector 828 can be at least partially positioned within the shaft bore 922. A portion of the conduit rotatable electrical connector 828 can extend outward from the shaft bore 922 beyond the shaft 822. A cap 928 can fit around the conduit rotatable electrical connector 828 to seal the shaft bore 922 and retain the conduit rotatable electrical connector 828 in the shaft 822.

The conduit rotatable electrical connector 828 can comprise a connector cable 980, which can extend from the shaft bore 922 to the cavity 920. The power cable 800 can be pulled into the cavity 250 through the enclosure cable passage 248. When coupled to the power cable 800, the connector cable 980 can supply power to another rotatable electrical connector, such as in the case of the conduit 820, or to electronics, such as an LED, a driver circuit, a speaker, or any other electronic component in the case of the electrical fixture 890. The connector cable 980 can comprise at least two separate electrically conductive members, such as two or more separate wires (not shown). The conduit rotatable electrical connector 828 can define a pocket 934. One of the wires of the connector cable 980 can be in electrical communication with at least a portion of an interior connector surface 932 defined by the pocket 934. A separate wire of the connector cable 980 can be in electrical communication with an exterior connector surface 930 of conduit rotatable electrical connector 828. The two connector surfaces 930,932 can be electrically isolated from one another.

The cable rotatable electrical connector 830 can be the female rotatable electrical connector 831 of the power cable 800. The cable rotatable electrical connector 830 can define a connector bore 914. The cable rotatable electrical connector 830 can comprise a center post 912 and at least one side spring 916. The center post 912 can be centered within the connector bore 914. The at least one side spring 916 can be positioned against walls of the connector bore 914. The center post 912 can be in electrical communication with one wire (not shown) of the power cable 800, and the at least one side spring 916 can be in electrical communication with another wire (not shown) of the power cable 800. The center post 912 can be electrically isolated from the at least one side spring 916.

When the shaft threads 826 of the shaft 822 are threadedly engaged with the insert threads 370 of the insert bore 368 and the shaft 822 is screwed into the mounting insert 260, the rotatable electrical connectors 828,830 can mate to form an electrical connection extending through the power cable 800 and the connector cable 980. The conduit rotatable electrical connector 828 can be received within the connector bore 914, and the pocket 934 can in turn receive the center post 912. The center post 912 can contact the interior connector surface 932 to form a first electrical connection between a wire of each of the cables 800,980. The at least one side spring 916 can contact the exterior connector surface 930 to form a second electrical connection between another wire of each of the cables 800,980. The two electrical connections can provide a positive and a negative path in a circuit, such as for a DC circuit, or a phase and a neutral path, such as for an AC circuit, for example and without limitation. By the nature of the electrical connections, the rotatable electrical connectors 828,830 can be rotated relative to one another while maintaining the separate electrical connections between components of the respective rotatable electrical connectors 828,830.

In the aspect shown, the main body 268 can define a connector engagement portion 962 (shown in broken lines), which can engage with the cable rotatable electrical connector 830 to secure the cable rotatable electrical connector 830 within the insert bore 368. In the aspect shown, the connector engagement portion 962 can taper inwards to engage with the retention structure 833. By securing the cable rotatable electrical connector 830 to the mounting insert 260, threading the shaft 822 into the mounting insert 260 can automatically mate the two rotatable electrical connectors 828,830. If desired, the shaft 822 can be threaded into the insert bore 368 while the mounting insert 260 is rotationally secured to the enclosure 240 by the locking collar 180, for example and without limitation.

In some aspects, the mounting insert 260 may not comprise the connector engagement portion 962. The conduit rotatable electrical connector 828 can extend through the main body 268, and the cable rotatable electrical connector 830 can be manually mated with the conduit rotatable electrical connector 828, such as after the mounting insert 260 has been rotationally fixed to the shaft 822, for example and without limitation. In some aspects, at least a portion of the shaft threads 826 can extend through the main body 268, and the cable collar 834 (shown in FIG. 8) can be engaged with the shaft threads 826 to prevent the rotatable electrical connectors 828,830 from pulling apart. In some aspects, the main body 268 can define male threads, and the cable collar 834 can be engaged with the shaft threads 826 to prevent the rotatable electrical connectors 828,830 from pulling apart.

In one exemplary aspect of an assembly sequence, the locking collar 180 can be removed from the enclosure 240, and the mounting insert 260 can be removed from the cavity 250. The mounting insert 260 can be threaded onto the shaft 822 and rotationally secured to the shaft 822, such as by threadedly tightening the mounting insert 260 with the shaft 822 and/or engaging the set screw 700 with the shaft threads 826. The main body 268 can define a threaded screw bore 960, which can receive the set screw 700. In aspects wherein tightening the mounting insert 260 onto the shaft 822 automatically mates the two rotatable electrical connectors 828,830, the mounting insert 260 can be engaged with the enclosure 240 with the conduit 820 and the mounting insert 260 in the desired rotational position, and the locking collar 180 can then be tightened to the tightened configuration. In aspects wherein tightening the mounting insert 260 onto the shaft 822 does not automatically mate the two rotatable electrical connectors 828,830, the two rotatable electrical connectors 828,830 can be manually mated together before engaging the mounting insert 260 with the enclosure 240 and tightening the locking collar 180.

One exemplary method for mounting an electrical fixture to a junction box can comprise inserting a threaded shaft of the electrical fixture through a locking collar of the junction box; screwing a mounting insert of the junction box onto the threaded shaft until the mounting insert is securely mounted to the threaded shaft; inserting the mounting insert into an opening of an enclosure of the junction box; rotationally indexing the mounting insert and the electrical fixture to a first rotational position relative to the enclosure; and positioning the locking collar in a tightened configuration on the enclosure to rotationally fix the locking collar to the enclosure. In some aspects, the method can further comprise engaging a set screw of the mounting insert with the threaded shaft. In some aspects, positioning the locking collar in the tightened configuration on the enclosure to rotationally fix the locking collar to the enclosure can comprise engaging an insert engagement structure of the mounting insert with an enclosure engagement structure of the enclosure. In some aspects, the insert engagement structure can comprise a protuberance, and the enclosure engagement structure can define a notch. In some aspects, positioning the locking collar in the tightened configuration on the enclosure to rotationally fix the locking collar to the enclosure can comprise repositioning the mounting insert within the opening to an engaged position; threadedly engaging the locking collar with the enclosure; and tightening the locking collar onto the enclosure.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A junction box comprising:
an enclosure defining a first enclosure end and a second enclosure end, a cavity extending into the enclosure from the first enclosure end towards the second enclosure end, the first enclosure end defining an opening to the cavity;
a mounting insert removably positioned within the opening, the mounting insert defining a threaded portion, the threaded portion configured to engage with a fixture to couple the fixture to the mounting insert; and
a locking collar removably coupled to the first enclosure end, the locking collar being repositionable on the first enclosure end between a tightened configuration and a loose configuration, the locking collar securing the mounting insert to the enclosure in the tightened configuration.

2. The junction box of claim 1, wherein:
the enclosure defines an enclosure axis extending from the first enclosure end to the second enclosure end; and
the mounting insert is rotationally and axially fixed to the enclosure with respect to the enclosure axis when the mounting insert is positioned within the opening and the locking collar is in the tightened configuration.

3. The junction box of claim 1, wherein:
the enclosure defines an enclosure axis extending from the first enclosure end to the second enclosure end; and
the mounting insert is rotatable relative to the enclosure about the enclosure axis when the mounting insert is positioned within the opening and the locking collar is in the loose configuration.

4. The junction box of claim 1, wherein:
the mounting insert defines an insert engagement structure;
the enclosure defines an enclosure engagement structure;
the mounting insert is movable between an engaged position and a disengaged position;
the insert engagement structure engages with the enclosure engagement structure and rotationally fixes the mounting insert to the enclosure when the mounting insert is in the engaged position; and
the insert engagement structure is spaced apart from the enclosure engagement structure and the mounting insert is rotatable relative to the enclosure when the mounting insert is in the disengaged position.

5. The junction box of claim 4, wherein the mounting insert is movable within the opening between the engaged position and the disengaged position.

6. The junction box of claim 4, wherein the insert engagement structure comprises a protuberance, and wherein the enclosure engagement structure defines a notch.

7. A junction box assembly comprising:
an electrical fixture;
a junction box comprising:
an enclosure defining a first enclosure end and a second enclosure end, the enclosure defining an enclosure axis extending from the first enclosure end to the second enclosure end, the first enclosure end defining an opening to a cavity of the enclosure;
a mounting insert removably positioned within the opening, the electrical fixture mounted to the mounting insert, the electrical fixture being rotationally fixed to the mounting insert; and
a locking collar removably coupled to the first enclosure end, the locking collar repositionable between a tightened configuration and a loose configuration; and
wherein the mounting insert is rotatable about the enclosure axis relative to the enclosure when the locking collar is in the loose configuration; and wherein the mounting insert is rotationally fixed to the enclosure about the enclosure axis when the locking collar is in the tightened configuration.

8. The junction box assembly of claim 7, wherein a stake is coupled to the junction box, and wherein the stake is configured to be driven into a ground surface to couple the junction box to the ground surface.

9. The junction box assembly of claim 7, wherein:
the electrical fixture comprises a threaded shaft; and
the threaded shaft threadedly engages a threaded portion of the mounting insert to couple the electrical fixture to the mounting insert.

10. The junction box assembly of claim 9, wherein:
the threaded shaft defines a first portion, a second portion, and a reduced shoulder between the first portion and the second portion;
a first diameter of the first portion is smaller than a second diameter of the second portion;
the first portion defines external threading of the threaded shaft; and
the reduced shoulder is engaged with a first insert end of the mounting insert when the electrical fixture is mounted to the mounting insert.

11. The junction box assembly of claim 10, wherein the reduced shoulder is directly engaged in facing engagement with the first insert end of the mounting insert when the electrical fixture is mounted to the mounting insert.

12. The junction box assembly of claim 9, wherein:
the threaded portion is a threaded bore defined by the mounting insert;
the threaded shaft is received by the threaded bore;
the electrical fixture further comprises a fixture cable extending through the threaded shaft; and
the fixture cable extends through the threaded bore to the cavity of the enclosure.

13. The junction box assembly of claim 12, further comprising a power cable comprising a first rotatable electrical connector, the first rotatable electrical connector engaging with a second rotatable electrical connector of the fixture cable to couple the power cable in electrical communication with the fixture cable, the first rotatable electrical connector being rotatable relative to the second rotatable electrical connector, the first rotatable electrical connector and the second rotatable electrical connector each at least partially positioned within the cavity.

14. The junction box assembly of claim 7, wherein:
the locking collar threadedly engages the enclosure; and
the locking collar is in the tightened configuration when the locking collar is tightened onto the enclosure.

15. A junction box comprising:
an enclosure defining a first enclosure end and a second enclosure end, a cavity extending into the enclosure from the first enclosure end towards the second enclosure end, the first enclosure end defining an opening to the cavity, the enclosure defining an enclosure engagement structure;
a mounting insert removably positioned within the opening, the mounting insert defining an insert engagement structure, the mounting insert being movable between an engaged position and a disengaged position, the insert engagement structure engaging with the enclosure engagement structure and rotationally fixing the mounting insert to the enclosure when the mounting insert is in the engaged position, the insert engagement structure being spaced apart from the enclosure engagement structure and the mounting insert being rotatable relative to the enclosure when the mounting insert is in the disengaged position; and
a locking collar removably coupled to the first enclosure end, the locking collar being repositionable on the first enclosure end between a tightened configuration and a loose configuration, the locking collar securing the mounting insert to the enclosure in the tightened configuration.

16. The junction box of claim 15, wherein:
the enclosure defines an enclosure axis extending from the first enclosure end to the second enclosure end; and
the mounting insert is rotationally and axially fixed to the enclosure with respect to the enclosure axis when the mounting insert is positioned within the opening and the locking collar is in the tightened configuration.

17. The junction box of claim 15, wherein:
the enclosure defines an enclosure axis extending from the first enclosure end to the second enclosure end; and
the mounting insert is rotatable relative to the enclosure about the enclosure axis when the mounting insert is positioned within the opening and the locking collar is in the loose configuration.

18. The junction box of claim 15, wherein the mounting insert is movable within the opening between the engaged position and the disengaged position.

19. The junction box of claim 15, wherein the insert engagement structure comprises a protuberance, and wherein the enclosure engagement structure defines a notch.

* * * * *